United States Patent
Son et al.

(10) Patent No.: US 10,362,430 B2
(45) Date of Patent: Jul. 23, 2019

(54) AUDIO PROVIDING METHOD AND DEVICE THEREFOR

(71) Applicant: Samsung Electronics Co., Ltd., Gyeonggi-do (KR)

(72) Inventors: Dong-Il Son, Gyeonggi-do (KR); Chi-Hyun Cho, Gyeonggi-do (KR); Chang-Ryong Heo, Gyeonggi-do (KR); Ji-Ho Chang, Gyeonggi-do (KR); Hee-Yeon Jeong, Seoul (KR); Jung-Su Ha, Gyeonggi-do (KR); Mi-Jeong Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/781,418

(22) PCT Filed: Nov. 25, 2016

(86) PCT No.: PCT/KR2016/013711
§ 371 (c)(1),
(2) Date: Jun. 4, 2018

(87) PCT Pub. No.: WO2017/095082
PCT Pub. Date: Jun. 8, 2017

(65) Prior Publication Data
US 2018/0359595 A1  Dec. 13, 2018

(30) Foreign Application Priority Data
Dec. 4, 2015 (KR) .................. 10-2015-0172599

(51) Int. Cl.
*H04S 7/00* (2006.01)
*H04R 5/04* (2006.01)
(Continued)

(52) U.S. Cl.
CPC ............... *H04S 7/303* (2013.01); *G01S 3/02* (2013.01); *G06K 9/00* (2013.01); *G06T 7/70* (2017.01);
(Continued)

(58) Field of Classification Search
CPC .. H04S 7/303; H04S 1/00; G06T 7/70; H04R 3/12; H04R 5/04
See application file for complete search history.

(56) References Cited

U.S. PATENT DOCUMENTS

| 5,790,181 A | 8/1998 | Chahl et al. |
| 6,252,496 B1 | 6/2001 | Jackson |

(Continued)

FOREIGN PATENT DOCUMENTS

| DE | 102007032272 | 1/2009 |
| JP | 2011000910 | 1/2011 |

(Continued)

OTHER PUBLICATIONS

PCT/ISA/210 Search Report issued on PCT/KR2016/013711 (pp. 3).

(Continued)

*Primary Examiner* — Regina N Holder
(74) *Attorney, Agent, or Firm* — The Farrell Law Firm, P.C.

(57) ABSTRACT

An electronic device may comprise: a sensing unit for acquiring image data and sensing an object and a user; an output unit for outputting audio; and a processor for receiving image data from the sensing unit, rendering information on a space from the image data to generate space information, recognizing the object in the space and mapping the object to the space information, recognizing the user in the space, and controlling the output unit on the basis of position (Continued)

information of the object and the user when a notification associated with the object occurs.

18 Claims, 23 Drawing Sheets

(51) Int. Cl.
  *G01S 3/02* (2006.01)
  *G06K 9/00* (2006.01)
  *H04R 3/12* (2006.01)
  *G06T 7/70* (2017.01)
  *H04R 5/02* (2006.01)
  *H04S 1/00* (2006.01)
(52) U.S. Cl.
  CPC ............... *H04R 3/12* (2013.01); *H04R 5/02* (2013.01); *H04R 5/04* (2013.01); *H04S 1/00* (2013.01); *G06K 9/00288* (2013.01); *G06K 9/00302* (2013.01); *G06K 9/00671* (2013.01); *G06K 9/00771* (2013.01); *H04R 2430/01* (2013.01); *H04S 2400/11* (2013.01)

(56) References Cited

U.S. PATENT DOCUMENTS

| | | |
|---|---|---|
| 2006/0001532 A1 | 1/2006 | Nagata |
| 2007/0172076 A1 | 7/2007 | Mori et al. |
| 2007/0274158 A1 | 11/2007 | Agam et al. |
| 2009/0316939 A1 | 12/2009 | Matsumoto et al. |
| 2010/0013653 A1 | 1/2010 | Bimbaum et al. |
| 2012/0093320 A1 | 4/2012 | Flaks et al. |
| 2013/0315034 A1 | 11/2013 | Yagihashi et al. |
| 2015/0309164 A1 | 10/2015 | Cho et al. |
| 2015/0317837 A1 | 11/2015 | Sholudko et al. |
| 2015/0332668 A1 | 11/2015 | Lukasiak et al. |
| 2016/0150314 A1 | 5/2016 | Nishidate |

FOREIGN PATENT DOCUMENTS

| | | |
|---|---|---|
| JP | 2011528476 | 11/2011 |
| JP | 2014139797 | 7/2014 |
| JP | 5676292 | 2/2015 |
| KR | 1020110052629 | 5/2011 |
| KR | 1020140077726 | 6/2014 |
| KR | 1020150122476 | 11/2015 |
| KR | 1020150125472 | 11/2015 |
| KR | 1020150130854 | 11/2015 |
| TW | 201325270 | 6/2013 |
| WO | WO 2016/084736 | 6/2016 |

OTHER PUBLICATIONS

PCT/ISA/237 Written Opinion issued on PCT/KR2016/013711 (pp. 7).
European Search Report dated Nov. 27, 2018 issued in counterpart application No. 16870978.0-1210, 6 pages.

AUDIO PROVIDING METHOD AND DEVICE THEREFOR

PRIORITY

This application is a National Phase Entry of International Application No. PCT/KR2016/013711, which was filed on Nov. 25, 2016, and claims priority to Korean Patent Application No. 10-2015-0172599, which was filed on Dec. 4, 2015, the contents of each of which are incorporated herein by reference.

TECHNICAL FIELD

Various embodiments of the present disclosure relate to a method for an electronic device to control audio output depending on space information and conditions of an object in a space in an electronic device, and a device thereof.

BACKGROUND ART

With the development of image processing technology, electronic devices can photograph a space using a camera and can identify an object existing in the space, thereby providing a user with notification information related to the object. In addition, with the development of audio processing technology, electronic devices can provide the user with the notification information related to the object using a sound.

DETAILED DESCRIPTION OF THE INVENTION

Technical Problem

As described above, in providing a user with information on an object identified by a camera using a sound, a conventional electronic device outputs the sound without considering the position of the user. Thus, the user pays attention to the electronic device having output the sound rather than the object that is an agent causing notification information, making it impossible to intuitively identify the position of the object. Further, after listening to all notification information transmitted via a sound, the user may know which object generated the notification information and thus waste unnecessary time figuring out which object caused the notification.

Various embodiments of the present disclosure provide a method and a device for processing an audio signal, in which an electronic device recognizes the positions of an object causing a notification and a user and adjusts a direction in which a sound physically proceeds and/or parameters for an audio signal to thereby provide an effect as if a sound is output from the object causing the notification.

Technical Solution

According to various embodiments of the present disclosure, an electronic device may include: a sensing unit configured to obtain image data and to sense an object and a user; an output unit configured to output a sound; and a processor configured to receive the image data from the sensing unit, to generate space information by rendering information on a space from the image data, to recognize the object in the space, to map the object to the space information, and to control the output unit on the basis of location information on the object and the user if a notification associated with the object occurs.

Advantageous Effects

In various embodiments of the present embodiments, the output of a sound is controlled on the basis of location information of an object and location information of a user. Further, when a notification occurs, a sound is reflected on the object associated with the notification by changing an audio output direction and is transmitted to the user. Accordingly, the user may feel as if the sound is output from the object associated with the notification, that is, the object causing the notification. Thus, the user may be provided with intuitive User Experience (UX).

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
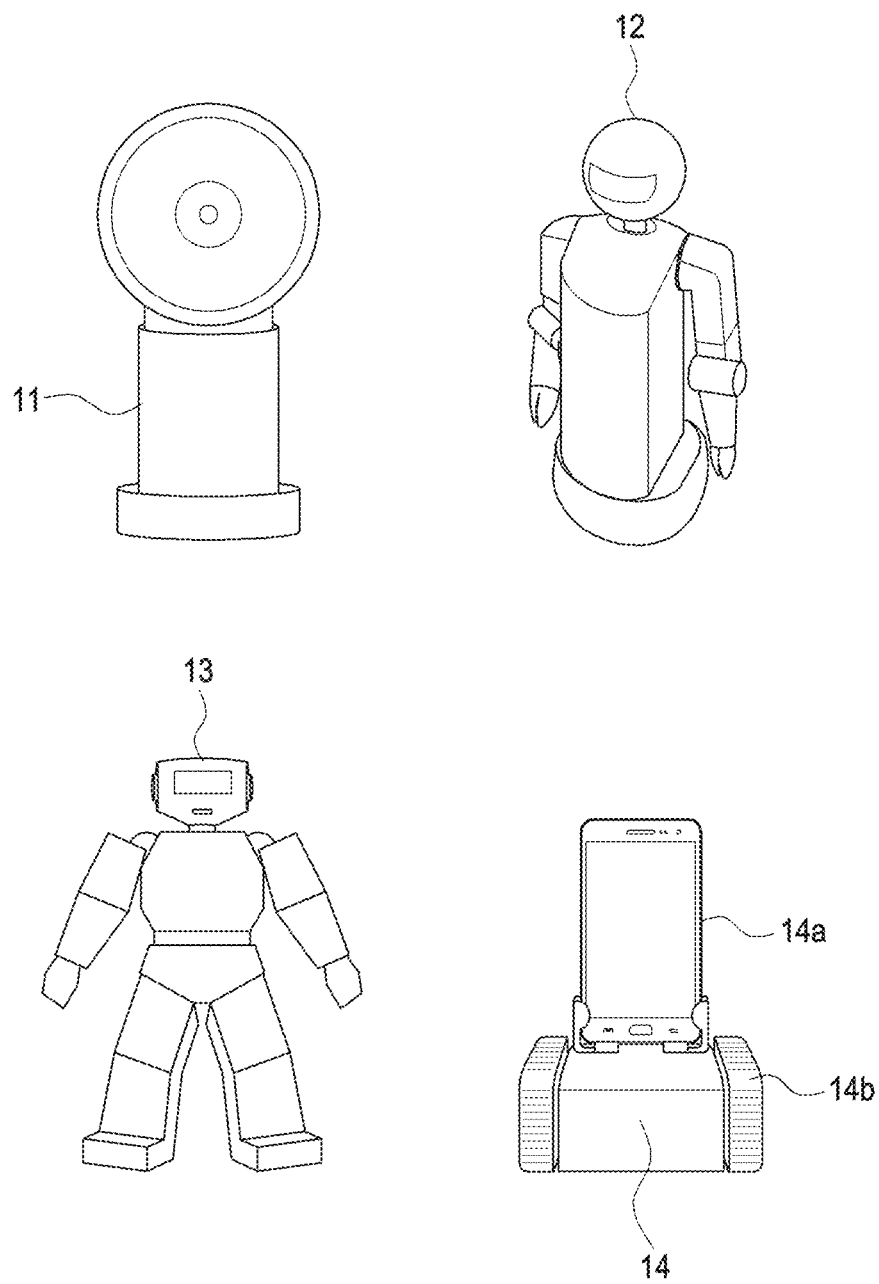
FIG. 1 illustrates an example of an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure. [31] It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

FIG. 1 illustrates an example of an electronic device according to various embodiments of the present disclosure.

Referring to FIG. 1, electronic devices may be divided into a standalone type 11, 12, or 13 and a docking station type 14. The standalone-type electronic device 11, 12, or 13 may independently perform any function of an electronic device. The docking station-type electronic device 14 has two or more functionally separated electronic devices, which are combined into a single entity to perform any function of an electronic device. For example, the docking station-type electronic device 14 includes a main body 14a and a driver 14b, in which the main body 14a may be mounted on a docking station (driver) and may be moved to a desired position.

Electronic devices may be classified into a stationary type 11 and a mobile type 12, 13, or 14 depending on mobility. The stationary-type electronic device 11 has no driver and thus cannot autonomously move. The mobile-type electronic device 12, 13, or 14 includes a driver and can autonomously move to a desired position. The mobile-type electronic device 12, 13, or 14 includes a wheel, a caterpillar, or a leg as a driver. Further, the mobile-type electronic device 12, 13, or 14 may include a drone.

Figure 2:
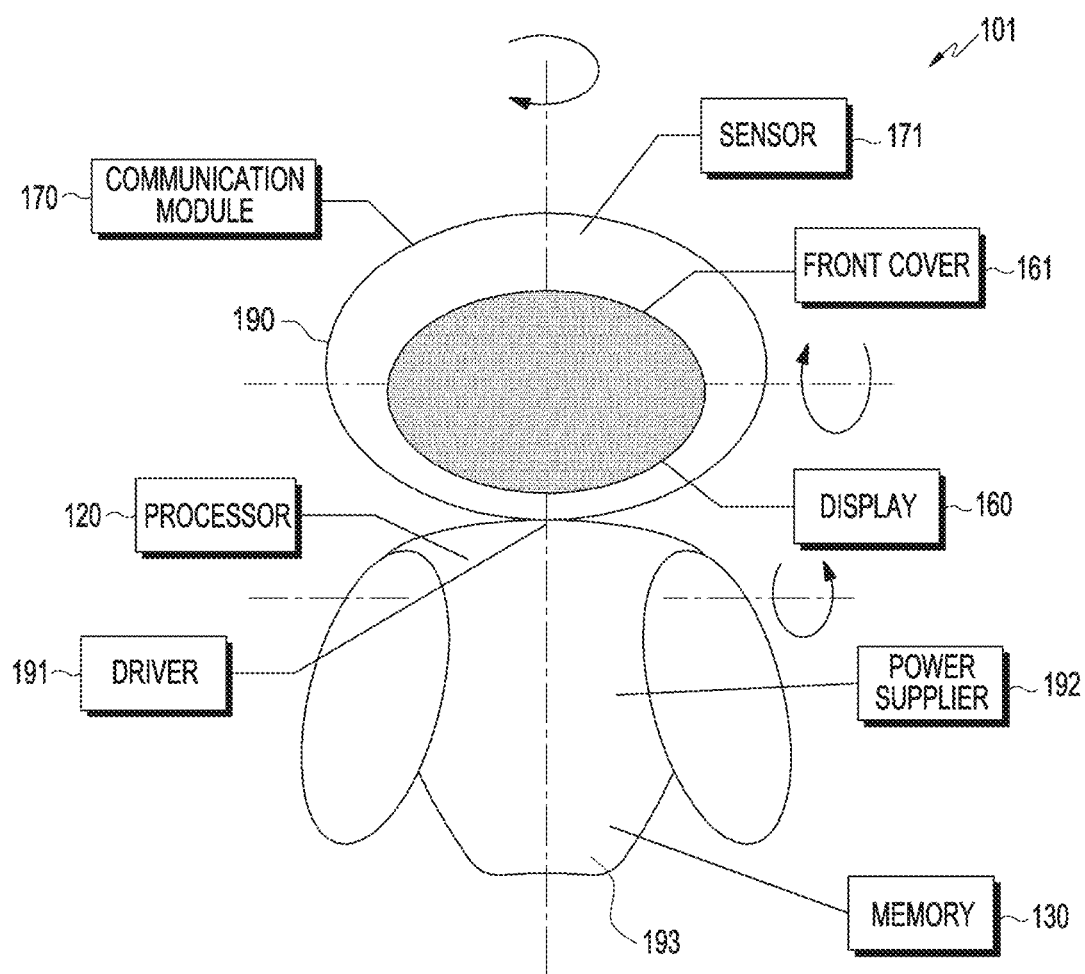
FIG. 2 illustrates an example of an electronic device according to various embodiments of the present disclosure.

FIG. 2 illustrates an example of an electronic device according to various embodiments of the present disclosure.

An electronic device 101 may be configured in the form of a robot. The electronic device 101 may include a head portion 190 and a body portion 193. The head portion 190 may be disposed above the body portion 193. In one embodiment, the head portion 190 and the body portion 193 may be configured in shapes respectively corresponding to a human head and a human body. For example, the head portion 190 may include a front cover 161 corresponding to the shape of a human face. The electronic device 101 may include a display 160 disposed at the position corresponding to the front cover 161. For example, the display 160 may be disposed inside the front cover 161, in which case the front cover 161 may include a transparent material or semitransparent material. Alternatively, the front cover 161 may be an element capable of displaying a screen, in which case the front cover 161 and the display 160 may be configured as individual pieces of hardware. The front cover 161 may be at least one of various sensors for image sensing toward a direction in which interaction with a user is performed, at least one microphone for obtaining a sound, at least one speaker for audio output, an instrumental eye structure, and a display for outputting a screen, may display a direction using light or a temporary instrumental change, and may include at least one H/W or instrumental structure that faces the user when interaction with the user is performed.

The head portion 190 may further include a communication module 170 and a sensor 171. The communication module 170 may receive a message from an external electronic device and may transmit a message to the external electronic device.

The sensor 171 may obtain information on an external environment. For example, the sensor 171 may include a camera, in which case the sensor 171 can photograph the external environment. The electronic device 101 may also identify the user on the basis of a photographing result. The sensor 171 may sense the proximity of the user to the electronic device 101. The sensor 171 may sense the proximity of the user on the basis of proximity information or may sense the proximity of the user on the basis of a signal from another electronic device (e.g., a wearable device) used by the user. In addition, the sensor 171 may sense an action or position of the user.

A driver 191 may include at least one motor capable of moving the head portion 190, for example, changing the direction of the head portion 190. The driver 191 may be used to move or to instrumentally change another component. Further, the driver 191 may have a form enabling upward, downward, leftward, or rightward movements with respect to at least one axis, and the form of the driver 191 may be variously modified. A power supplier 192 may supply power used by the electronic device 101.

A processor 120 may obtain a message wirelessly transmitted from another electronic device via the communication module 170 or may obtain a voice message via the sensor 171. The processor 120 may include at least one message analysis module. The at least one message analysis module may extract or classify main content to be delivered to a recipient from the message generated by a sender.

A memory 130 is a repository capable of permanently or temporarily storing information related to providing a service to a user and may be disposed inside the electronic device 101 or may be disposed in a cloud or another server via a network. The memory 130 may store space information generated by the electronic device 101 or received from the outside. The memory 130 may store personal information for user authentication, property information about a method for providing service to the user, or information for identifying a relationship between various means capable of interacting with the electronic device 101. Here, the information on the relationship may be changed by updating or learning information depending on the use of the electronic device 101. The processor 120 is responsible for controlling the electronic device 101 and may functionally control the sensor 171, an input/output interface 150, the communication module 170, and the memory 130 to provide services to the user. An information determination unit capable of determining information that the electronic device 101 can obtain may be included in at least a portion of the processor 120 or the memory 130. The information determination unit may extract at least one or more pieces of data for a service from information obtained through the sensor 171 or the communication module 170.

Although the electronic device 101 is configured in the form of a robot, which is merely an example, the electronic device 101 may be configured in any form without limitation.

In various embodiments of the present disclosure, the memory 130 may store instructions that enable the processor 120, during an operation, to obtain an image and to output a message generated on the basis of an image analysis result, obtained by analyzing the obtained image, and additional information.

Figure 3:
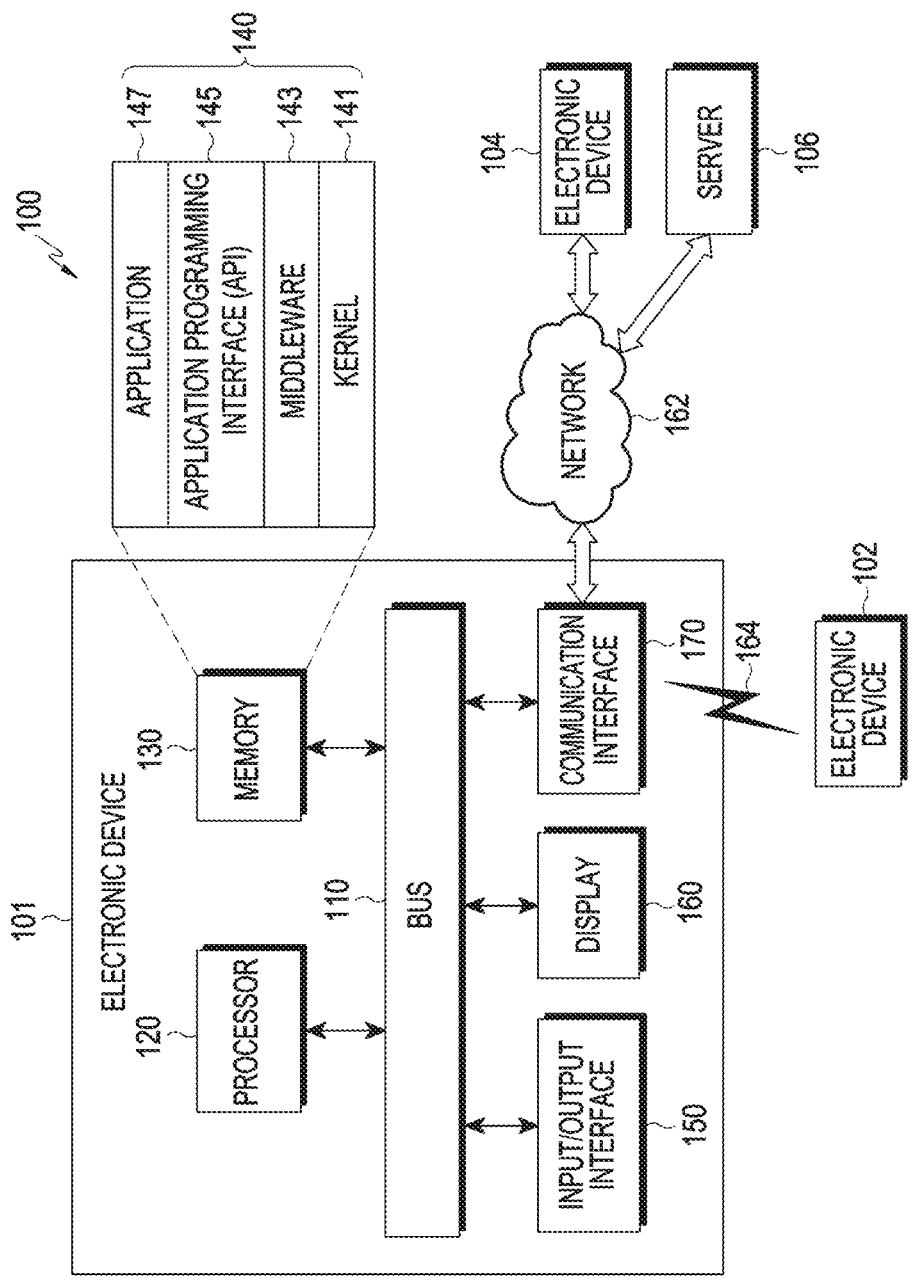
FIG. 3 is a block diagram illustrating an electronic device and a network according to various embodiments of the present disclosure.

FIG. 3 is a block diagram illustrating an electronic device and a network according to various embodiments of the present disclosure.

Referring to FIG. 3, the electronic device 101 may include a bus 110, a processor 120, a memory 130, an input/output interface 150, a display 160, and a communication module 170. In some exemplary embodiments, at least one of the components may be omitted, or other components may be further included in the electronic device 101.

The bus 110 may include, for example, a circuit that connects the components 110 to 170 to each other and delivers communications (for example, control messages and/or data) between the components.

The processor 120 may include one or more of a Central Processing Unit (CPU), an Application Processor (AP), a Communication Processor (CP), a Graphic Processor (GP), a Multi-Chip Package (MCP), and an Image Processor (IP). The processor 120 may control, for example, at least one different component of the electronic device 101, and/or may perform operations relating to communication or data processing.

The memory 130 may include a volatile and/or a nonvolatile memory. The memory 130 may store, for example, a command or data related to at least one different component of the electronic device 101. According to one exemplary embodiment, the memory 130 may store software and/or a program 140. The program 140 may include, for example, a kernel 141, middleware 143, an Application Programming Interface (API) 145, and/or an application (or "app") 147. At least part of the kernel 141, the middleware 143, and the API 145 may be designated as an Operating System (OS).

The kernel 141 may control or manage system resources (for example, the bus 110, the processor 120, the memory 130, or the like) used to perform an operation or function implemented, for example, in other programs (for example, the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data.

Further, the middleware 143 may process one or more requests for operations received from the application 147 according to the priority thereof. For example, the middleware 143 may assign at least one application 147 a priority for using a system resource (for example, the bus 110, the processor 120, the memory 130, or the like) of the electronic device 101. For example, the middleware 143 may process the one or more requests for operations according to the priority assigned to the at least one application, thereby performing scheduling or load balancing for the one or more requests for operations.

The API 145 is, for example, an interface for the application 147 to control a function provided from the kernel 141 or the middleware 143, and may include, for example, at least one interface or function (for example, a command) for file control, window control, image processing, or text control.

The input/output interface 150 may serve as an interface that delivers a command or data, which is input from, for example, a user or a different external device, to a different component(s) of the electronic device 101. Further, the input/output interface 150 may output a command or data, which is received from a different component(s) of the electronic device 101, to the user or to the different external device. The input/output interface 150 may include a touch input device, a voice input unit, various remote control devices, or the like. The input/output interface 150 may be at least one tool for providing a particular service to the user. For example, when information to be transmitted is a sound, the input/output interface 150 may be a speaker. When information to be transmitted is text or image content, the input/output interface 150 may be a display device. In addition, data that needs to be output in order to provide a service for the user who is far away from the electronic device 101 may be transmitted and output to at least one another electronic device through a communication module, in which the other electronic device may be a speaker or a different display device.

The display 160 may include, for example, a Liquid Crystal Display (LCD), a Light-Emitting Diode (LED) display, an Organic Light-Emitting Diode (OLED) display, a Micro-Electro-Mechanical Systems (MEMS) display, or an electronic paper display. The display 160 may display, for example, various types of content (for example, text, an image, a video, an icon, or a symbol) for the user. The display 160 may include a touch screen and may receive touch, gesture, proximity, or hovering input using, for example, an electronic pen or a body part of a user.

The communication module 170 may establish communication, for example, between the electronic device 101 and an external device (for example, a first external electronic device 102, a second external electronic device 104, or a server 106). For example, the communication module 170 may be connected to a network 162 via wireless communication or wired communication to communicate with the external device (for example, the second external electronic device 104 or the server 106). The communication module 170 is a tool capable of transmitting/receiving at least one data to/from another electronic device, which may communicate with another electronic device via at least one of (communication standards) Wireless Fidelity (Wi-Fi), ZigBee, Bluetooth, LTE, 3G, and IR protocols.

The wireless communication may use, for example, a cellular communication protocol, which may be, for example, at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM). Further, the wireless communication may include, for example, short-range communication 164. The short-range communication 164 may include, for example, at least one of Wi-Fi, Bluetooth, Near-Field Communication (NFC), and Global Navigation Satellite System (GNSS). The GNSS may include, for example, at least one of a Global Positioning System (GPS), a Global Navigation Satellite System (GLONASS), a BeiDou Navigation Satellite System, and Galileo, which is the European global satellite-based navigation system, depending on a use area or bandwidth. In the present document, "GPS" may be interchangeably used with "GNSS" hereinafter. The wire-based communication may include, for example, at least one of Universal Serial Bus (USB), High-Definition Multimedia Interface (HDMI), Recommended Standard 232 (RS-232), and Plain Old Telephone Service (POTS). The network 162 may include a telecommunications network, which may be, for example, at least one of a computer network (for example, a Local Area Network (LAN) or Wide Area Network (WAN)), the Internet, and a telephone network.

The first and second external electronic devices 102 and 104 may each be a device of a type that is the same as, or different from, that of the electronic device 101. According to one embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to one embodiment, when the electronic device 101 needs to perform a function or service automatically or upon request, the electronic device 101 may request another electronic device (for example, the electronic device 102 or 104, or the server 106) to perform at least some functions related to the function or service, instead of, or in addition to, autonomously performing the function or service. The other electronic device (for example, the electronic device 102 or 104, or the server 106) may perform the requested functions or additional functions and may transmit the result thereof to the electronic device 101. The electronic device 101 may provide the requested function or service using the same received result or by additionally processing the result. To this end, for example, cloud-computing, distributed-computing, or client-server-computing technologies may be used.

Figure 4A:
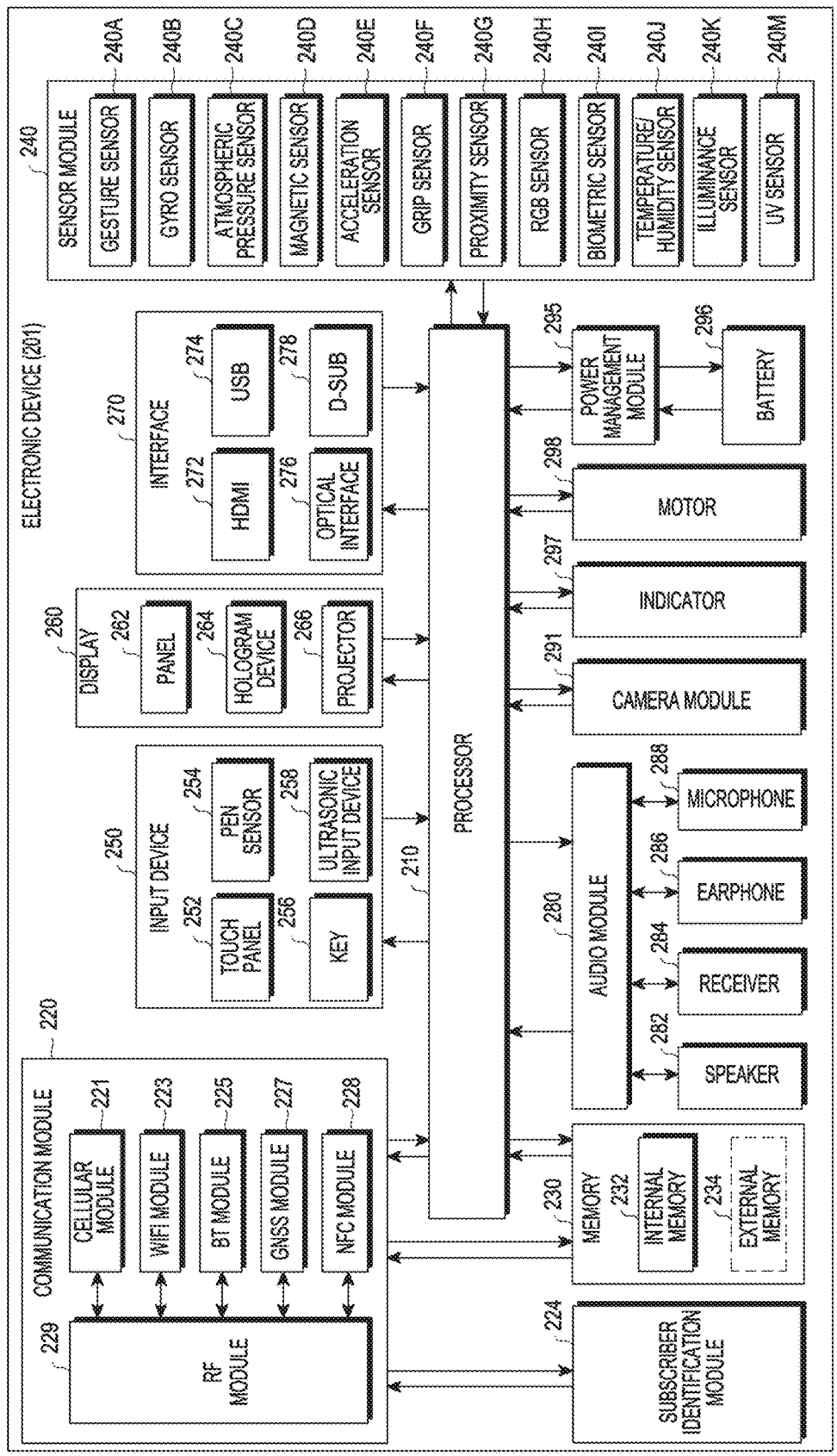
FIG. 4A and FIG. 4B are block diagrams illustrating an electronic device according to various embodiments of the present disclosure.
Figure 4B:
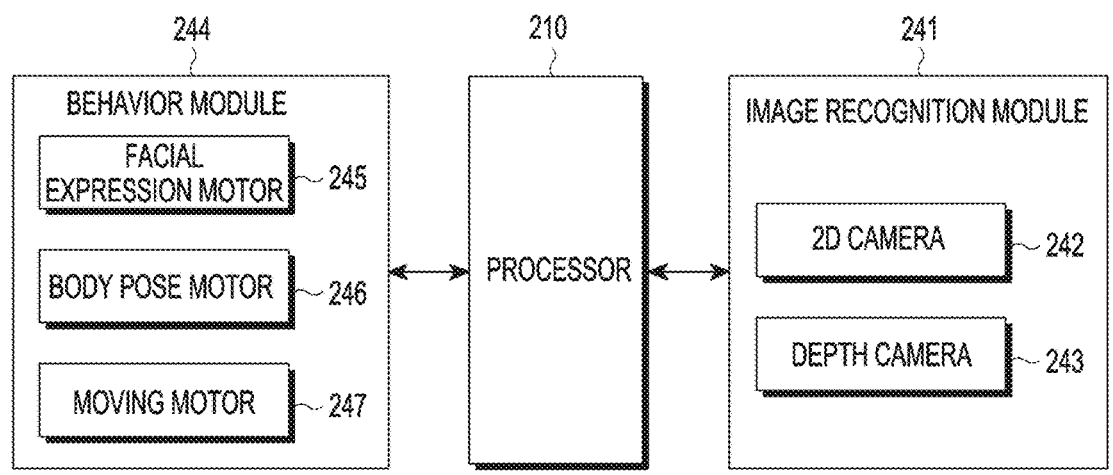

FIG. 4A and FIG. 4B are block diagrams illustrating an electronic device according to various embodiments of the present disclosure.

The electronic device 201 may include, for example, all or part of the electronic device 101 illustrated in FIG. 3. The electronic device 201 may include one or more processors (for example, Application Processors (APs)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processors 210 may run, for example, an operating system or an application to control a plurality of hardware or software components that are connected to the processors 210, and may perform various kinds of data processing and operations. The processors 210 may be configured, for example, as a System on Chip (SoC). According to one embodiment, the processors 210 may further include a Graphic Processing Unit (GPU) and/or an image signal processor. The processors 210 may include at least part (for example, a cellular module 2) of the components illustrated in FIG. 4A. The processors 210 may load a command or data received from at least one of other components (for example, a nonvolatile memory) into a volatile memory to process the command or data, and may store various types of data in the nonvolatile memory.

The communication module 220 may have a configuration that is the same as, or similar to, that of the communication module 170 in FIG. 3. The communication module 220 may include, for example, a cellular module 221, a Wi-Fi module 223, a Bluetooth module 225, a global navigation satellite system (GNSS) module 227 (for example, a GPS module, a GLONASS module, a BeiDou module, or a Galileo module), an NFC module 228, and a Radio Frequency (RF) module 229.

The cellular module 221 may provide, for example, a voice call, a video call, a text messaging service, or an Internet service through a communication network. According to one embodiment, the cellular module 221 may perform identification and authentication of the electronic device 201 in a communication network using a Subscriber Identity Module (SIM, for example, a SIM card) 224. According to one embodiment, the cellular module 221 may perform at least some of the functions provided by the processors 210. According to one embodiment, the cellular module 221 may include a Communication Processor (CP).

The Wi-Fi module 223, the Bluetooth module 225, the GNSS module 227, and the NFC module 228 may each include, for example, a processor to process data transmitted and received via the respective modules. According to one embodiment, at least some (for example, two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a Power Amplifier (amp) Module (PAM), a frequency filter, a Low-Noise Amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including a SIM and/or an embedded SIM, and may include unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random-Access Memory (DRAM), a Static RAM (SRAM), a Synchronous Dynamic RAM (SDRAM), or the like) and a nonvolatile memory (for example, a One-Time Programmable Read-Only Memory (OTPROM), a Programmable ROM (PROM), an Erasable And Programmable ROM (EPROM), an Electrically Erasable and a Programmable ROM (EEPROM), a mask ROM, a flash ROM, a flash memory (for example, an NAND flash, an NOR flash, or the like), a hard drive, or a Solid-State Drive (SSD)).

The external memory 234 may further include a flash drive, for example, a Compact Flash (CF), a Secure Digital (SD), a micro Secure Digital (micro-SD), a mini Secure Digital (mini-SD), an extreme digital (xD), a Multi-Media Card (MMC), a memory stick, or the like. The external memory 234 may be functionally and/or physically connected to the electronic device 201 through various interfaces.

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, and blue (RGB) sensor), a biometric sensor 240I, a temperature/humidity sensor 240J, an illuminance sensor 240K, and an ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit to control at least one or more sensors belonging thereto. In one embodiment, the electronic device 201 may further include a processor configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258. The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or may include a separate recognition sheet. The key 256 may include, for example, a physical button, an optical key, or a keypad. The ultrasonic input device 258 may detect ultrasonic waves generated in an input tool through a microphone (for example, a microphone 288) and may identify data corresponding to the detected ultrasonic waves.

The display 260 (for example, a display 160) may include a panel 262, a hologram device 264, or a projector 266. The panel 262 may include a configuration that is the same as, or similar to, that of the display 160 of FIG. 1. The panel 262 may be configured, for example, to be flexible, transparent, or wearable. The panel 262 may be formed with the touch panel 252 in a single module. The hologram device 264 may display a three-dimensional image in the air using light interference. The projector 266 may project light onto a screen to display an image. The screen may be disposed, for example, inside or outside the electronic device 201. According to one embodiment, the display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. Additionally or alternatively, the interface 270 may include, for example, a Mobile High-Definition Link (MHL) interface, a Secure Digital (SD) card/Multi-Media Card (MMC) interface, or an Infrared Data Association (IrDA) interface.

The audio module 280 may bidirectionally convert, for example, a sound and an electrical signal. At least some components of the audio module 280 may be included, for example, in the input/output interface 150 illustrated in FIG. 3. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an Image Signal Processor (ISP), or a flash (for example, an LED, a xenon lamp, or the like).

The power management module 295 may manage, for example, the power of the electronic device 201. According to one embodiment, the power management module 295 may include a Power Management Integrated Circuit (PMIC), a charger Integrated Circuit (IC), or a battery or fuel gauge. The PMIC may have wire-based and/or wireless charging methods. The wireless charging methods may include, for example, a magnetic resonance method, a magnetic induction method, or an electromagnetic wave method, and may further include an additional circuit for wireless charging, such as a coil loop, a resonance circuit, or a rectifier. The battery gauge may measure, for example, the remaining battery charge, the charging voltage, the current, or temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state. The motor 298 may convert an electrical signal into mechanical vibrations, and may generate vibrations or a haptic effect. Although not shown, the electronic device 201 may include a processing device for supporting a mobile TV (for example, a GPU). The processing device for supporting the mobile TV may process media data, for example, in accordance with Digital Multimedia Broadcasting (DMB), Digital Video Broadcasting (DVB), or mediaFlo™ standards.

Referring to FIG. 4B, the processor 210 may be connected to an image recognition module 241. In addition, the processor 210 may be connected to a behavior module 244. The image recognition module 241 may include at least one of a two-dimensional (2D) camera 242 and a depth camera 243. The image recognition module 241 may perform recognition on the basis of a photographing result and may transmit the recognition result to the processor 210. The behavior module 244 includes at least one of: a facial expression motor 245 to display a facial expression of the electronic device 101 or to change the orientation of a face; a body pose motor 245 to change the pose of the body portion of the electronic device 101, for example, the position of an arm, a leg, or a finger; and a moving motor 247 to move the electronic device 101. The processor 210 may control at least one of the facial expression motor 245, the body pose motor 246, and the moving motor 247 to control the movement of the electronic device 101 configured in the form of a robot. The electronic device 101 may also include the components of FIG. 4B in addition to the components of FIG. 4A.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 5:
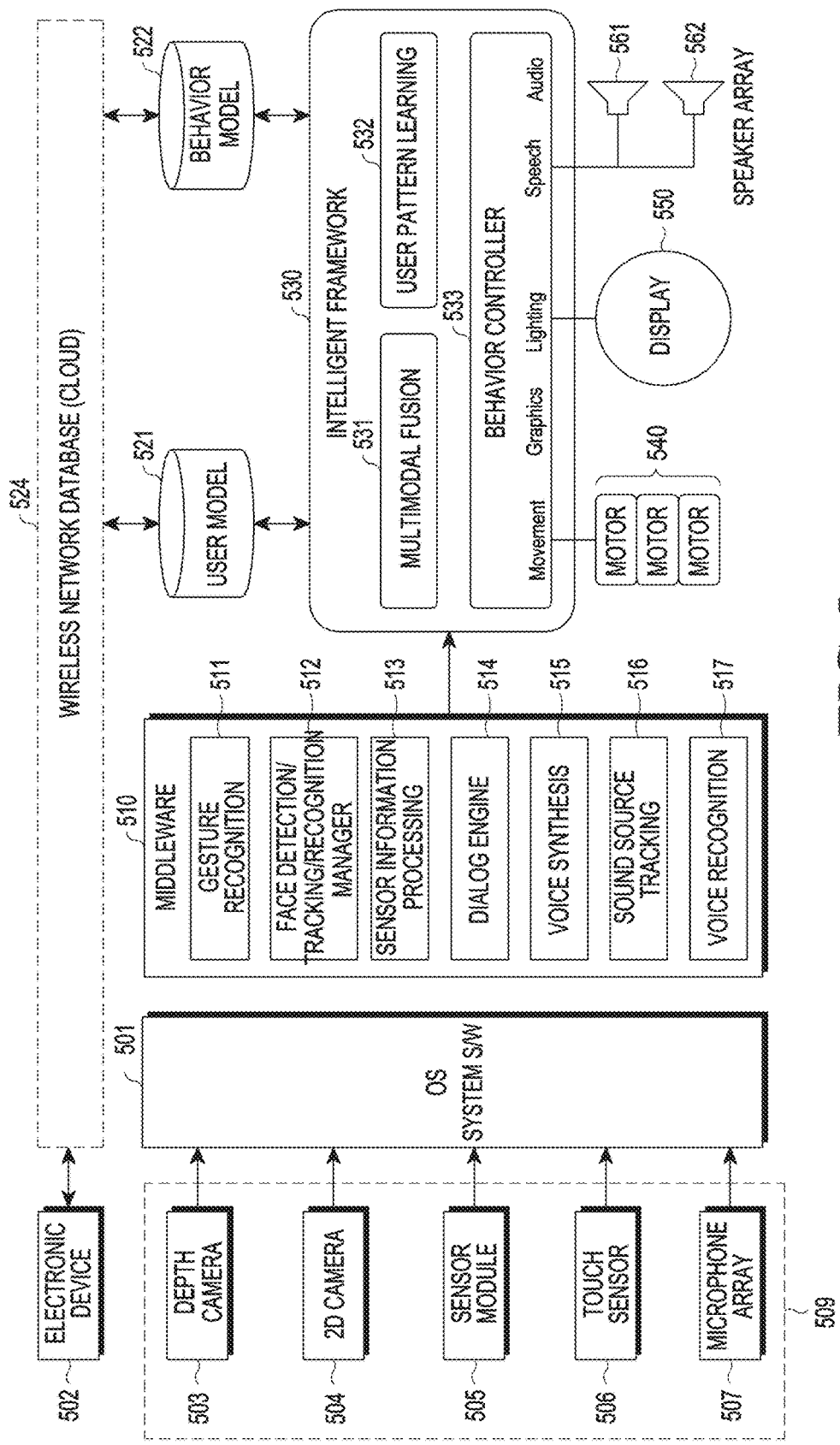
FIG. 5 is a block diagram illustrating the software of an electronic device according to various embodiments of the present disclosure.

FIG. 5 is a block diagram illustrating the software of an electronic device according to various embodiments of the present disclosure.

Referring to FIG. 5, the electronic device may include OS/system software 501, middleware 510, and an intelligent framework 530.

The OS/system software 501 may distribute resources of the electronic device and may perform job scheduling and process processing. Also, the OS/system software may process data received from various hardware input units 509. The hardware input units 509 may include at least one of a depth camera 503, a 2D camera 504, a sensor module 505, a touch sensor 506, and a microphone array 507.

The middleware 510 may perform a function of the electronic device using data processed by the OS/system software 501. According to one embodiment, the middleware 510 may include a gesture recognition manager 511, a face detection/tracking/recognition manager 512, a sensor information processing manager 513, a dialog engine manager 514, a voice synthesis manager 515, a sound source tracking manager 516, and a voice recognition manager 517.

According to one embodiment, the face detection/tracking/recognition manager 512 may analyze an image captured by the 2D camera 504 to detect or track the position of the user's face, and may perform authentication through face recognition. The gesture recognition manager 511 may recognize a 3D gesture of the user by analyzing images captured by the 2D camera 504 and the depth camera 503. The sound source tracking manager 516 may analyze a sound input through the microphone 507 and may track the input position of a sound source. The voice recognition manager 517 may analyze a voice input through the microphone 507 to recognize the inputted voice.

The intelligent framework 530 may include a multimodal fusion block 531, a user pattern learning block 532, and a behavior control block 533. According to one embodiment, the multimodal fusion block 531 may collect and manage information processed in the middleware 510. The user pattern learning block 532 may extract and learn significant information, such as the user's life pattern or preference, using the information in the multimodal fusion module 531. The behavior control block 533 may provide information that the electronic device feeds back to the user as a motion of the electronic device, visual information, or audio information. That is, the behavior control block 533 may control a motor 540 of a driver to move the electronic device, may control a display such that a graphic object is displayed on the display 550, or may control speakers 561 and 562 to output a sound.

A user model database 521 may store data learned by the electronic device via the intelligent framework 530 according to individual users. A behavior model database 522 may store data for behavior control of the electronic device. The user model database 521 and the behavior model database 522 may be stored in a memory of the electronic device, or may be stored in a cloud server via a network and may be shared with another electronic device 502.

Figure 6A:
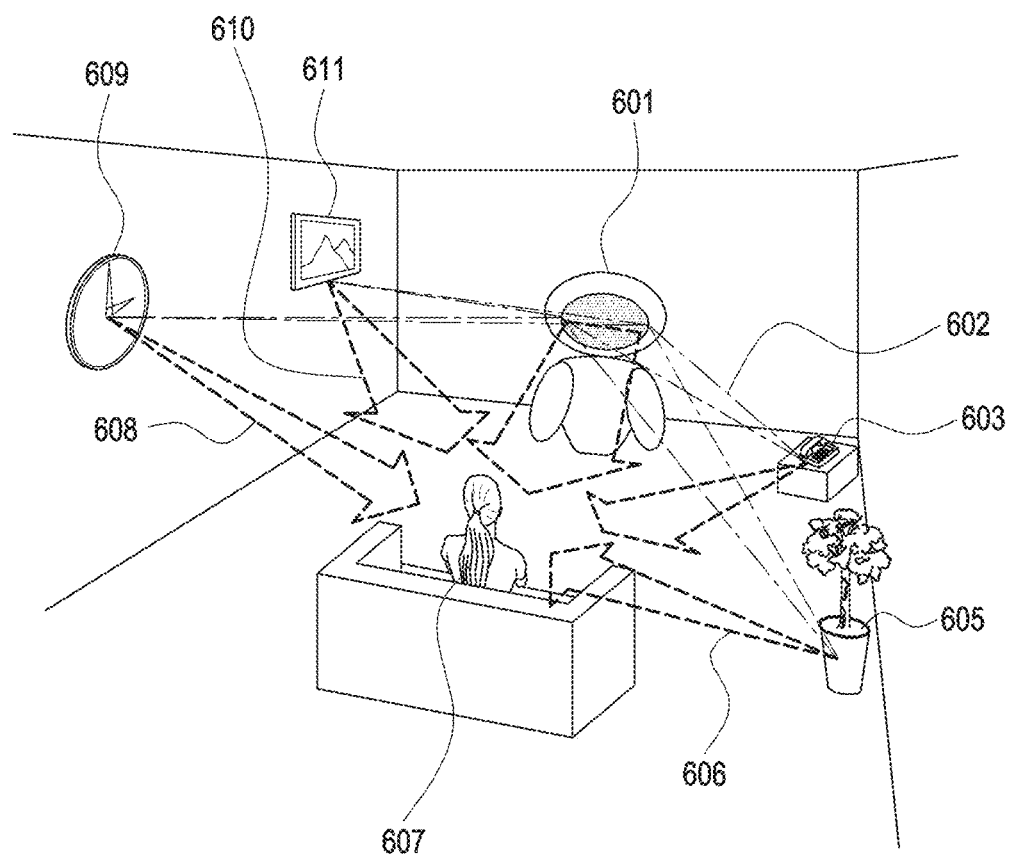
FIG. 6A illustrates an interaction operation between an electronic device and an object according to various embodiments of the present disclosure.

FIG. 6A illustrates an interaction operation between an electronic device and an object according to various embodiments of the present disclosure.

Referring to FIG. 6A, the electronic device 601 may be disposed at the front of a space. Objects 603 and 605 may be disposed on the left of the electronic device 601 in the space, and objects 609 and 611 may be disposed on the right wall in the space. The objects 603, 605, 609, and 611 may be things in the space. The objects 603, 605, 609, and 611 may be things that are functionally connected to the electronic device 601 via wired or wireless communication or that are not functionally connected to the electronic device 601. For example, the object 603 may be a telephone and may be functionally connected to the electronic device 601. The object 605 may be a flowerpot and may not be functionally connected to the electronic device. The object 609 may be a clock and may be functionally connected to the electronic device. The object 611 may be a frame and may not be functionally connected to the electronic device.

The electronic device 601 may sense the space via a camera and may identify the position of a user and an object. The electronic device 601 may recognize the user and the object from an image captured through the camera, may extract location information on the user and the object, and may map the location information to space information. For example, referring to the captured image, the electronic device 601 may divide the structure of the space into front, rear, right, left, ceiling, or floor with respect to the electronic device 601. For example, the electronic device may recognize that, on the basis of the electronic device, the object 603 is disposed in the left front portion off the space, the object 605 is disposed in the left rear portion of the space, the user 607 is located in the center of the space, the object 609 is disposed in the right rear portion of the space, and the object 611 is disposed in the right front portion of the space.

Alternatively, when the object is functionally connected to the electronic device 601, the object may transmit information thereof to the electronic device. For example, the objects 603 and 609 may be functionally connected to the electronic device 601 and may transmit location information to the electronic device 601.

The electronic device 601 may check the state of the object disposed in the space and may provide the user with a notification corresponding to the object. The notification may be provided as a sound through an output unit of the electronic device 601. For example, when the electronic device 601 determines that the frame 611 is slanted, the electronic device 601 may provide the user with an audio notification reporting "The frame is leaning". When the electronic device 601 determines that flowers in the flowerpot 609 are withering, the electronic device 601 may provide the user with an audio notification reporting "Please water the flowers".

The electronic device 601 may control an audio output unit of the electronic device 601 on the basis of the location information on the user and the object. When providing the notification corresponding to the object, the electronic device 601 may control the audio output unit of the electronic device 601 to adjust an audio output direction, audio latency, a frequency band and/or volume per frequency band so that the user feels as if the sound is output from the object related to the notification. The electronic device 601 may identify the position of the user and the object in the space and may make the user feel as if the sound is output from the object on the basis of the location information on the user and the object triggering the notification. For example, when the frame 611 is leaning, the electronic device 601 may control the audio output unit to change an audio output direction 610 so that the user feels as if the sound is output from the position of the frame 611. When a notification occurs due to the clock 609, the electronic device 601 may control the audio output unit to change an audio output direction 608 so that the user feels as if the notification is output from the clock 609. When a notification occurs due to the flowerpot 605, the electronic device 601 may control the audio output unit to change an audio output direction 606 so that the user feels as if the notification is output from the flowerpot 605.

Further, the electronic device 601 may control a driver of the electronic device 601 on the basis of the location information on the user and the object. When providing the notification corresponding to the object, the electronic device 601 may control the driver of the electronic device 601 to move the electronic device 601 to a particular position or to change the orientation of the electronic device 601 so that the user feels as if the sound is output from the object triggering the notification. The electronic device 601 may identify the position of the user and the object in the space and may control the driver of the electronic device 601 on the basis of the location information on the user and the object triggering the notification, thereby making the user feel as if the sound is output from the object. For example, when the frame 611 is leaning, the electronic device 601 may control the driver of the electronic device 601 to move the electronic device 601 or to change the orientation of the electronic device 601, thus changing the audio output direction 610, so that the user 607 feels as if the sound is output from the position of the frame 611. When a notification occurs due to the clock 609, the electronic device 601 may control the driver of the electronic device 601 to move the electronic device 601 or to change the orientation of the electronic device 601, thus changing the audio output direction 608, so that the user feels as if the notification is output from the clock. When a notification occurs due to the flowerpot 605, the electronic device 601 may control the driver of the electronic device 601 to move the electronic device 601 or to change the orientation of the electronic device 601, thus changing the audio output direction 606, so that the user feels as if the notification is output from the flowerpot.

Figure 6B:
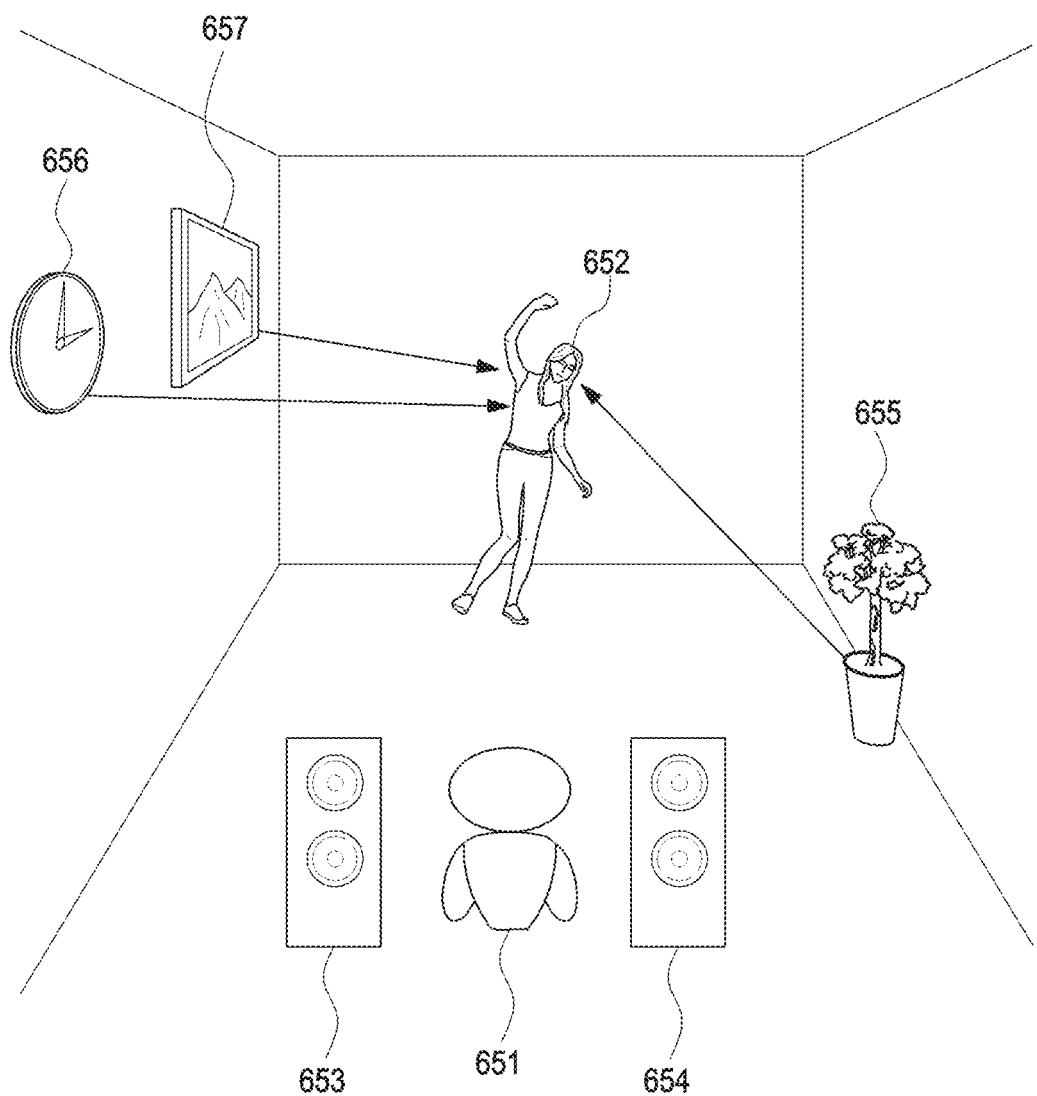
FIG. 6B illustrates an example in which an electronic device sets an audio parameter and outputs a sound according to various embodiments of the present disclosure.

FIG. 6B illustrates an example in which an electronic device modifies an audio parameter according to various embodiments of the present disclosure.

FIG. 6B shows the electronic device 651, a user 652, audio output devices 653 and 654, and objects 655, 656, and 657. The audio output devices 653 and 654 may be functionally connected to the electronic device 651 through wired or wireless communication and may include a driver. The orientation of the audio output devices 603 and 2004 may be changed by the drivers.

The electronic device 651 may obtain space information on where the electronic device 651 is located and may set a point where audio reflection may occur. The electronic device 651 may render the space information and may map the space information to the point where audio reflection may occur.

The objects 655, 656, and 657 may be things in the space. The objects 655, 656, and 657 may be things that are functionally connected to the electronic device 651 via wired or wireless communication or that are not functionally connected to the electronic device 651. For example, the object 655 may be a flowerpot and may not be functionally connected to the electronic device 651. The object 656 may be a clock and may be functionally connected to the electronic device 651. The object 657 may be a frame and may not be functionally connected to the electronic device 651.

The electronic device 651 may sense the space via a camera and may identify the position of the user 652 and the objects 655, 656, and 657. The electronic device 651 may recognize the user 652 and the objects 655, 656, and 657 from an image captured through the camera, may extract location information on the user and the objects, and may map the location information to space information. For example, referring to the captured image, the electronic device 651 may divide the structure of the space into front, rear, right, left, ceiling, or floor with respect to the electronic device 651. For example, the electronic device 651 may recognize that, on the basis of the electronic device 651, the object 655 is disposed in the right middle portion of the space, the object 656 is disposed in the left front portion of the space, the object 657 is disposed in the left rear portion of the space, and the user 652 is located in the front rear portion of the space. When the objects 655, 656, and 657 are functionally connected to the electronic device 651, the objects 655, 656, and 657 may transmit information thereof to the electronic device 651. For example, the object 656 may be functionally connected to the electronic device 651 and may transmit location information to the electronic device 651.

The electronic device 651 may identify the position of the objects 655, 656, and 657 and the position of the user 652 and may set an audio parameter so that the user 652 at the position feels as if a sound is output from the objects 655, 656, and 657. As audio parameters, sound latency for left and right-channel sounds and/or volume per frequency band may be set.

For example, the electronic device 651 may identify the position of the flowerpot 655 in the space and the position of the user 652, and may output a sound by setting, among the audio parameters, the sound latency for the left-channel sound to '0', setting the sound latency for the right-channel sound to '3', and setting the volume to '3' so as to feel as if the sound is output from the flowerpot. Accordingly, the user may feel as if the sound is output from a left middle position respective to the user.

Alternatively, the electronic device 651 may generate an audio parameter (for example, the sound latency for the left-channel sound set to '0', the sound latency for the right-channel sound set to '3', and the volume set to '3') and may transmit the audio parameter, along with audio data, to the audio output devices 654 and 655 so as to feel as if the sound is output from the flowerpot. The audio output devices 653 and 654 may set the sound latency for the left-channel sound to '0', the sound latency for the right-channel sound set to '3', and the volume set to '3' on the basis of the audio parameter received from the electronic device 651, thereby outputting a sound.

In another example, the electronic device 651 may identify the position of the clock 656 in the space and the position of the user 652, and may output a sound by setting, among the audio parameters, the sound latency for the left-channel sound to '5', setting the sound latency for the right-channel sound to '0', and setting the volume to '2' so as to feel as if the sound is output from the clock 656. Accordingly, the user may feel as if the sound is output from a right middle position respective to the user.

Alternatively, the electronic device 651 may generate an audio parameter (for example, the sound latency for the left-channel sound set to '5', the sound latency for the right-channel sound set to '0', and the volume set to '2') and may transmit the audio parameter, along with audio data, to the audio output devices 654 and 655 so as to feel as if the sound is output from the clock 656. The audio output devices 653 and 654 may set the sound latency for the left-channel sound to '5', the sound latency for the right-channel sound set to '0', and the volume set to '2' on the basis of the audio parameter received from the electronic device 651, thereby outputting a sound.

In still another example, the electronic device 651 may identify the position of the frame 657 in the space and the position of the user 652, and may output a sound by setting, among the audio parameters, the sound latency for the left-channel sound to '3', setting the sound latency for the right-channel sound to '0', and setting the volume to '4' so as to feel as if the sound is output from the frame 657. Accordingly, the user may feel as if the sound is output from a right middle position respective to the user.

Alternatively, the electronic device 651 may generate an audio parameter (for example, the sound latency for the left-channel sound set to '3', the sound latency for the right-channel sound set to '0', and the volume set to '4') and may transmit the audio parameter, along with audio data, to the audio output devices 654 and 655 so as to feel as if the sound is output from the frame 657. The audio output devices 653 and 654 may set the sound latency for the left-channel sound to '3', the sound latency for the right-channel sound set to '0', and the volume set to '4' on the basis of the audio parameter received from the electronic device 651, thereby outputting a sound.

Figure 7:
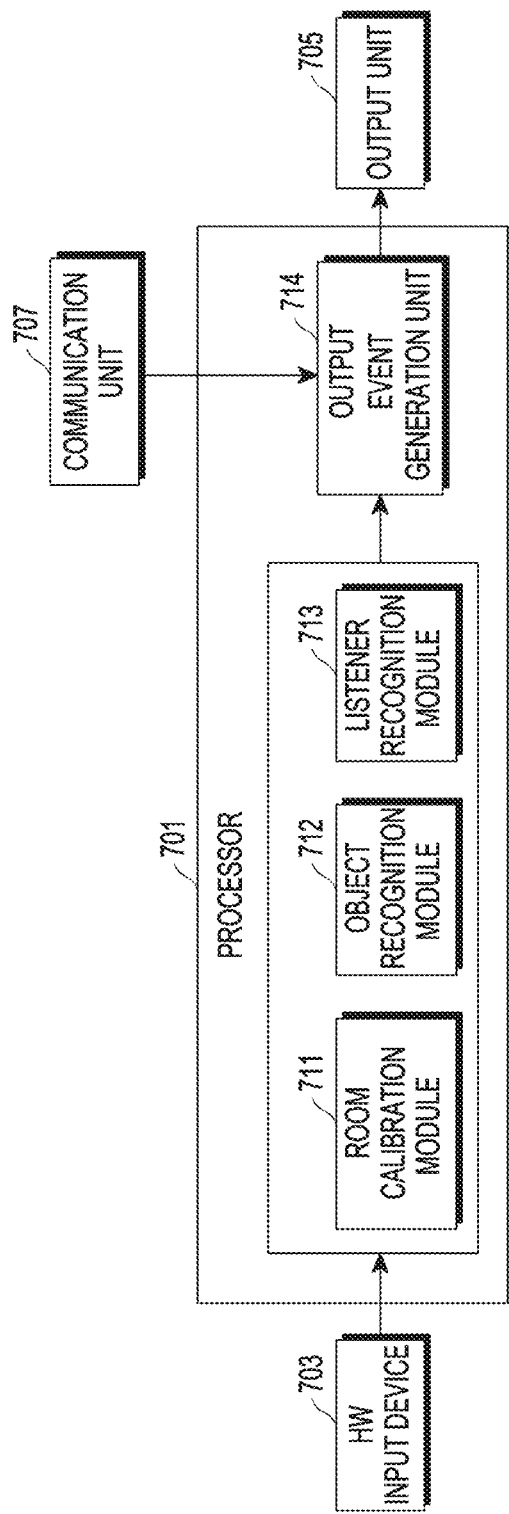
FIG. 7 is a block diagram schematically illustrating an electronic device according to various embodiments of the present disclosure.

FIG. 7 is a block diagram schematically illustrating an electronic device according to various embodiments of the present disclosure.

Referring to FIG. 7, the electronic device may include a processor 701, an input unit 703, an output unit 705, and a communication unit 707.

The input unit 703 may include a camera, a sensor unit, and a microphone. The camera may photograph a space in which a user and an object are located and may output image data. The sensor unit may sense a motion of the user or the object and may output sensed data accordingly. Also, the sensor unit may measure the depth value of the user or object and may output sensed data accordingly. The microphone may receive a sound output from the electronic device and may output a signal accordingly. The electronic device may analyze a reflected sound input to the microphone and may generate a feedback signal on the sound output from the electronic device.

The processor 701 may include a room calibration module 711, an object recognition module 712, a listener recognition module 713, and an output event generation unit 714. The room calibration module 711, the object recognition module 712, the user recognition module 713, and the output event generation module 714 may be stored as a program in a memory and may be loaded and executed as a command code in the processor 701.

The room calibration module 711 may obtain information on a space in which the electronic device is disposed, using the image data and the sensor data received from the input unit. The electronic device may adjust a parameter of an audio output unit on the basis of the obtained information on the space.

The object recognition module 712 may recognize an object in the space where the electronic device is disposed. For example, when the space is a home, the object may be a TV, a sofa, a telephone, a flowerpot, furniture, a clock, or a PC, which may be present in the home. The object recognition module 712 may include a user recognition unit that recognizes at least one user.

The user recognition module 713 may identify the user using at least one biometric feature of the user. When there is no database having information on the identity of the user, the user recognition module 713 may classify the user by age, race, or gender using a physical feature of the user.

The communication unit 707 may receive data from the outside of the electronic device and may transmit the received data to the output event generation unit 714. For example, when the electronic device receives a text message from the outside, the electronic device may transmit the text message to the output event generation unit 714.

The output event generation module 714 may analyze information obtained via the input unit 703, data received via the communication unit 707, or information in the electronic device. When an output event is needed according to the analysis result, the output event generation module 714 may generate an output event appropriate for a situation and may transmit information necessary for event generation and information on a method for outputting generated information to the output unit 705.

The output unit 705 may include a speaker driver to physically control a speaker and a speaker output unit to output the output event as a sound. The speaker driver or the speaker output unit may be formed with the electronic device in a single body or may be connected to the electronic device by a wired or wireless method. According to various embodiments, the output unit may not include a physical driver, and may output an audio notification by changing a parameter for audio output or by audio beamforming.

The output unit 705 may include a plurality of output units. The processor 701 may transmit an audio signal to be output via the plurality of output units to the output unit according to the generated event notification. An aimed direction may be determined depending on the positions of the plurality of output units, and thus the user may feel the directivity of an output sound.

Figure 8:
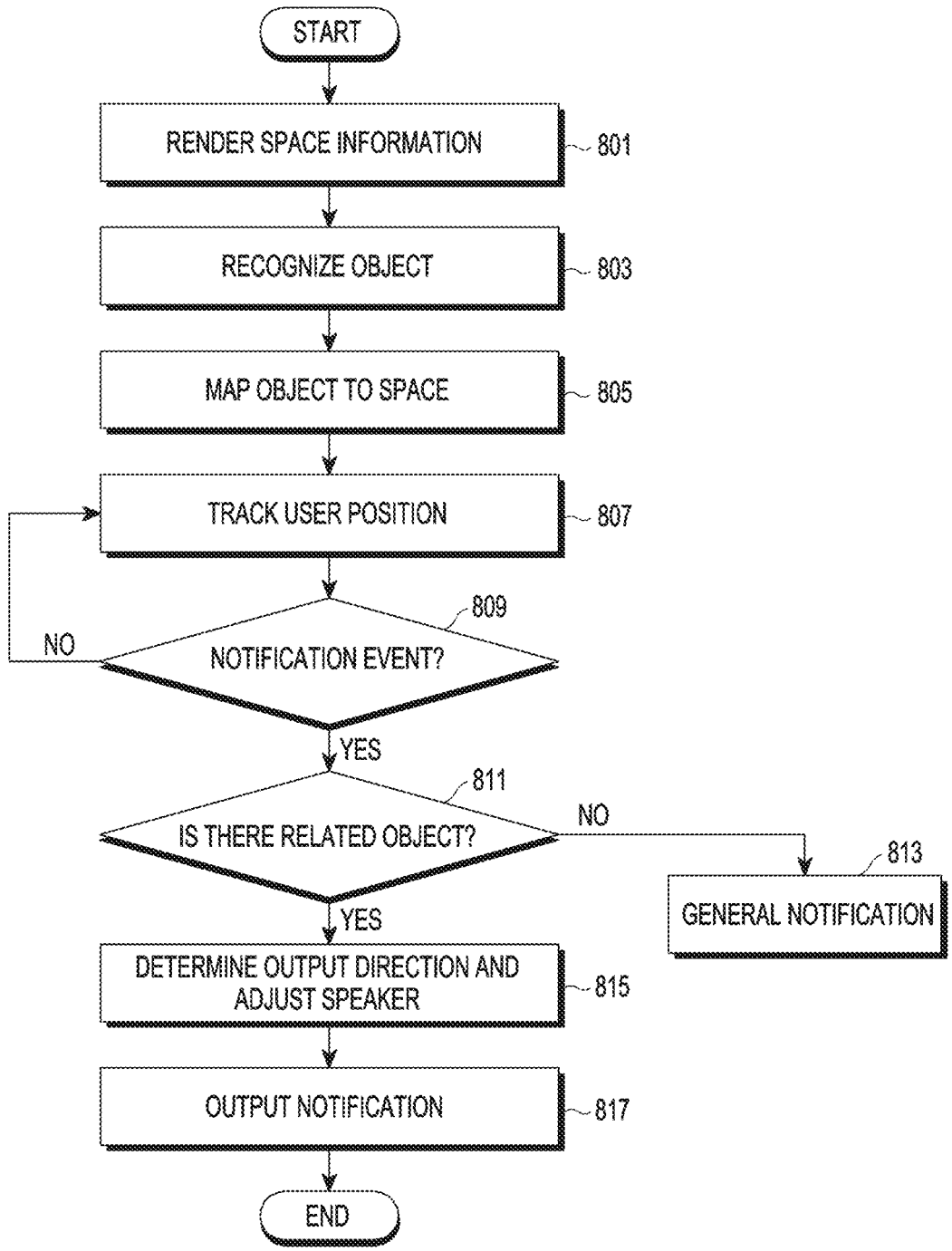
FIG. 8 is a flowchart illustrating a process in which an electronic device identifies a space and an object and provides a notification according to various embodiments of the present disclosure.

FIG. 8 is a flowchart illustrating a process in which an electronic device identifies a space and an object and provides a notification according to various embodiments of the present disclosure.

Referring to FIG. 8, the electronic device may obtain space information. For example, the electronic device may sense a space. The electronic device may photograph the space via a camera and may render captured image data into space information (801). Specifically, a room calibration module may render an image captured by the camera, thereby obtaining information on the space in which the electronic device is disposed. The electronic device may identify the structure of the space through the room calibration module. For example, the electronic device may render the space information, thereby recognizing that the space in which the electronic device is currently disposed includes front, rear, left and right sides, a ceiling, and a floor.

The electronic device may sense an object. The electronic device may recognize an object existing in the space after rendering the space information (803). For example, as a result of rendering the space information, when the space is recognized as a house, object recognition rate may be increased using spatial characteristics of the house. Specifically, the object recognition rate may be increased using information about an object that may exist in the house. When the object is recognized, the electronic device may map the position of the object to the space information obtained in 801 (805). The electronic device may determine the position of the object existing in the space by mapping the position of the object.

After recognizing the space and objects existing in the space, the electronic device may recognize a user existing in the space. When at least one user is recognized in the space, the electronic device may identify the user by referring to information that is already known. After recognizing the user, when the user is moving, the electronic device may track the position of the user (807). After the user is identified, the electronic device may map the position of the user to the space information. The electronic device may identify the user and may determine a direction in which the user looks. The electronic device may analyze the data captured by the camera to determine in which direction the user is currently looking, and may map the determined direction of the user to the space information. For example, the electronic device may determine whether the user looks at the electronic device, looks at the left wall or at the right wall, looks at the ceiling or the floor, or looks at the front wall, and may map the direction of the user to the space information. The electronic device may determine the optimal position where the user can listen to a sound, using direction information on the user mapped to the space information.

When mapping of the space information is completed, the electronic device may determine whether there is a notification received through a communication unit or a notification generated in the electronic device (809). When there is a notification, the electronic device may output the notification to the identified user via an audio output unit. When there is no notification, the electronic device may continue to perform the foregoing operations.

When there is a notification, the electronic device may generate a notification event. The electronic device may determine the notification event and may determine whether an object related to the notification event exists in a position where the user is currently located (811). Here, when an object related to the notification event is not currently found in the space, the electronic device may provide a general notification to the user (813). Here, the electronic device may transmit the notification via an output unit functionally connected to the electronic device. As a result of analyzing the notification event, when there is an object related to the notification in the space, the electronic device may find the position of the user and the position of the object from the rendered space information, and may determine an audio output direction and may adjust the position of a speaker on the basis of location information on the user and location information on the object (815). The electronic device may output the notification by adjusting the audio output direction of the audio output unit and the volume of a sound (817).

Figure 9:
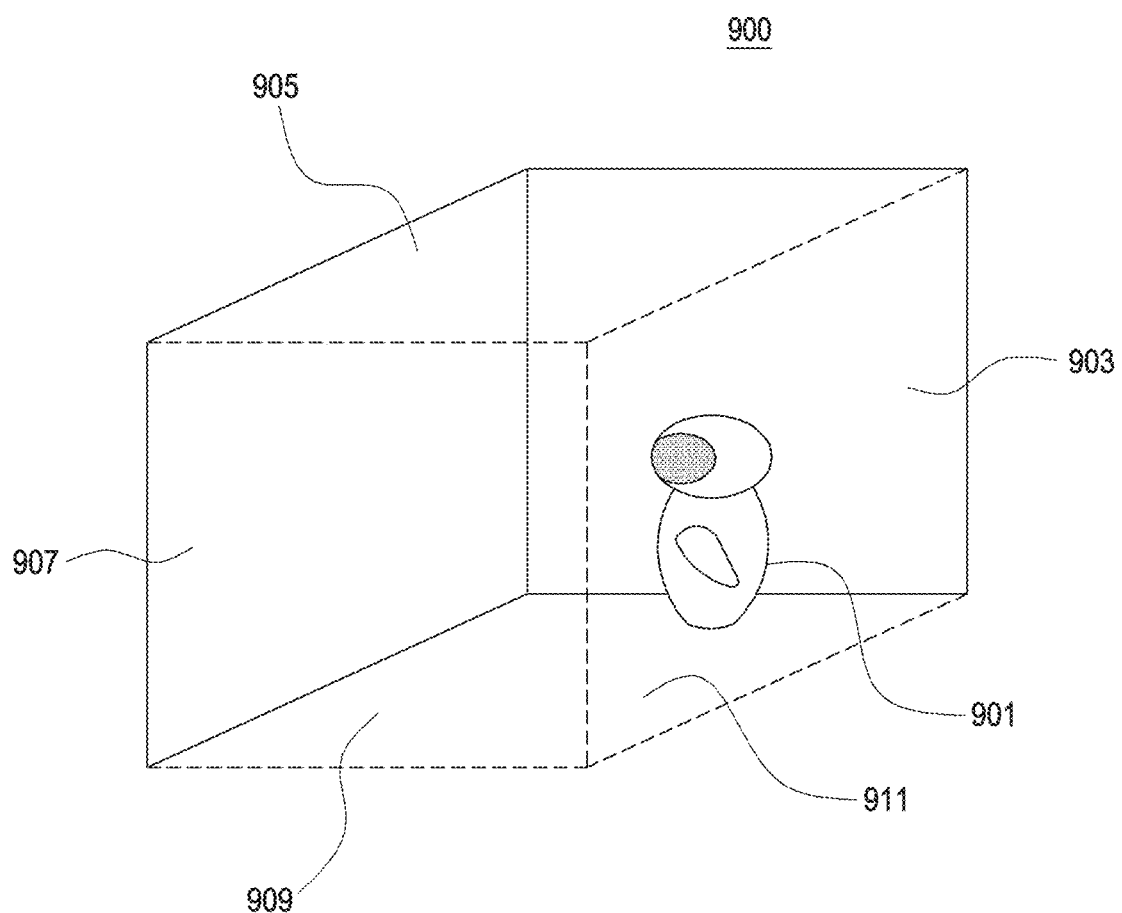
FIG. 9 illustrates an example in which an electronic device renders a space according to various embodiments of the present disclosure.

FIG. 9 illustrates an example in which an electronic device renders a space according to various embodiments of the present disclosure.

FIG. 9 shows the electronic device 901 disposed in a space. When the position of the electronic device 901 is changed, the electronic device 901 may receive space information on the space 900 of the position through an input unit. Specifically, the electronic device 901 may receive information about the space in which the electronic device 901 is disposed through a camera and a sensor device included in the electronic device 901. Alternatively, the electronic device 901 may receive the space information via an external camera and sensor device functionally connected to the electronic device 901.

The electronic device 901 may set a reflection plane in the space for sound positioning through reflection when recognizing the space, and may render the space on the basis of information on the reflection plane. For example, the electronic device 901 may divide the space into a front side 907, a left side 909, a right side 903, a ceiling 905, and a floor 911 on the basis of the current position of the electronic device 901 and may set each side as a reflection plane for reflecting a sound.

Figure 10A:
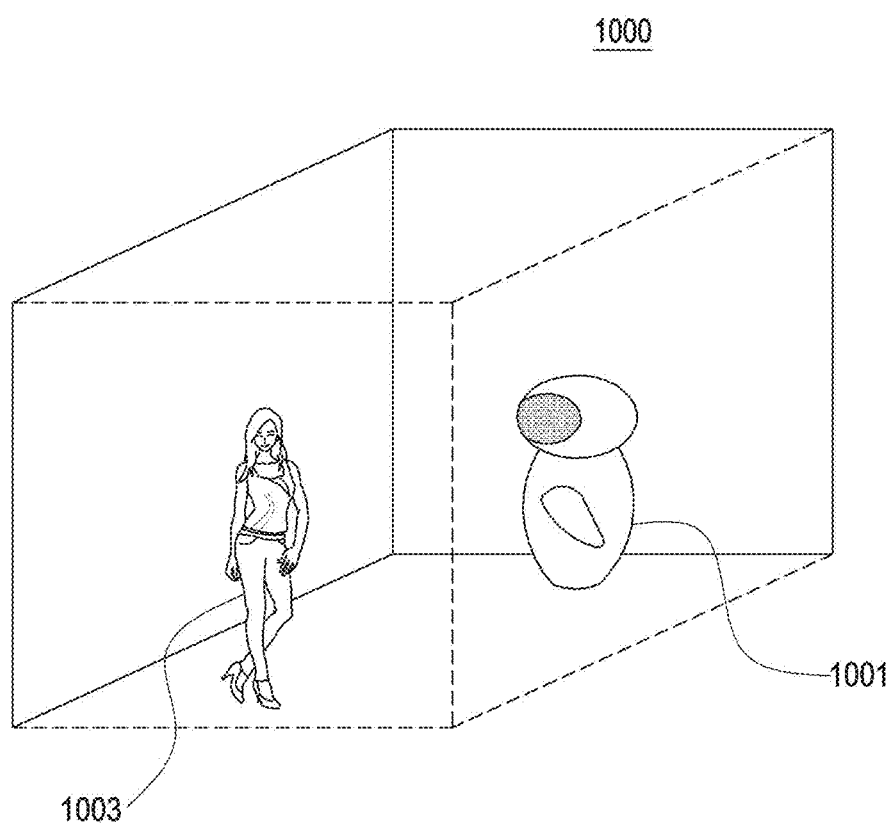
FIG. 10A illustrates an embodiment in which an electronic device recognizes a user and monitors the position of the user.

FIG. 10A illustrates an embodiment in which an electronic device recognizes a user and monitors the position of the user. Referring to FIG. 10, the electronic device 1001 may recognize at least one user 1003 in a space 1000. The electronic device 1001 may render space information and may then recognize the user 1003 in the space 1000. When the user 1003 is recognized, the electronic device 1001 may identify the user 1003 by referring to a user model database. When the user 1003 is identified, the electronic device 1001 may map user information to the rendered space information.

When the user 1003 moves to a different position, the electronic device 1001 may identify the user 1003 and may recognize the new position of the user 1003. The electronic device 1001 may determine the position of the user 1003 in the space and may recognize a direction in which the user 1003 looks. For example, the electronic device 1001 may render the space information, may identify the user 1003, and may determine the position of the identified user 1003 to be a front left position. When rendering the space information, the electronic device 1001 may divide the space into a plurality of virtual areas, may determine a virtual area where the recognized user 1003 is located, and may determine the position of the user 1003 on the basis of the virtual area.

When the user 1003 is recognized, the electronic device 1001 may retrieve the face of the user 1003 and may determine in which direction the face of the user 1003 looks. When the direction of the face of the user 1003 is determined, the electronic device 1001 may map information on the direction in which the user 1003 looks to the space information.

Figure 10B:
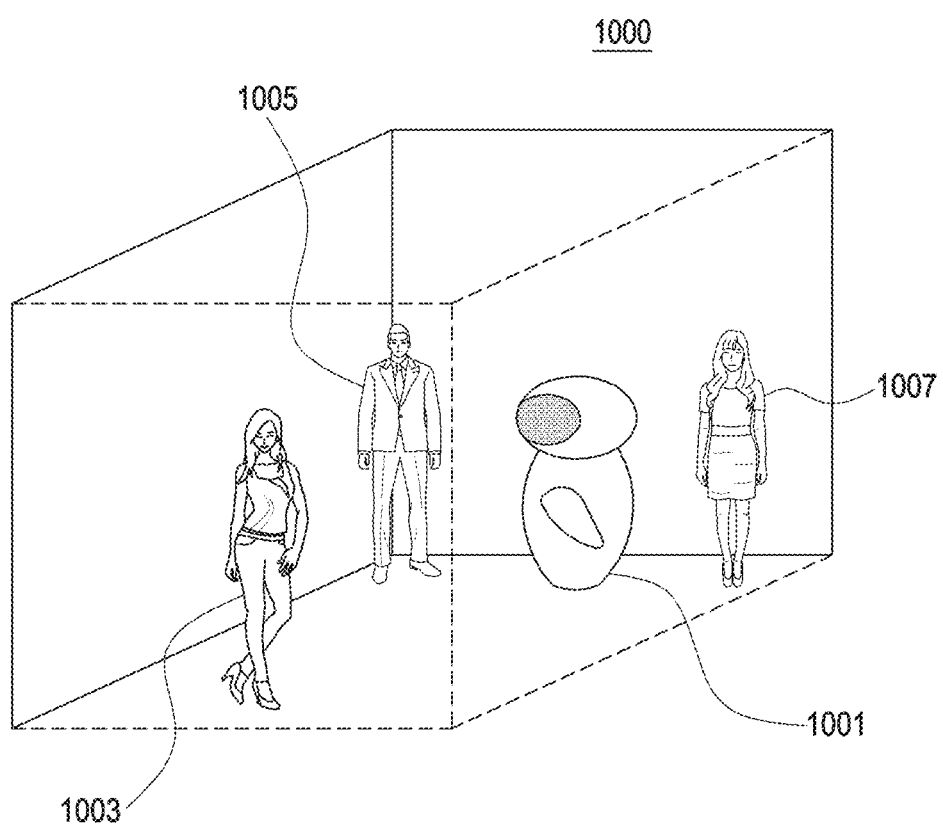
FIG. 10B illustrates an example in which an electronic device recognizes and processes a plurality of users.

FIG. 10B illustrates an example in which an electronic device recognizes and processes a plurality of users. Referring to FIG. 10B, an electronic device 1001 and a plurality of users 1003, 1005, and 1007 are in a space 1000. The electronic device 1001 may render space information and may then recognize the plurality of users 1003, 1005, and 1007 in the space 1000. When the plurality of users 1003, 1005, and 1007 is recognized, the electronic device 1001 may identify the plurality of users 1003 by referring to a user model database. When the plurality of users 1003, 1005, and 1007 is identified, the electronic device 1001 may map user information to the rendered space information.

The electronic device 1001 may determine the position of the plurality of users 1003, 1005, and 1007 in the space. When rendering the space information, the electronic device 1001 may divide the space into a plurality of virtual areas, may determine a virtual area where the recognized users are located, and may determine the position of the users on the basis of the virtual area. For example, the electronic device 1001 may render the space information, may identify the user 1003, and may determine the position of the identified user 1003 to be a front left position. The electronic device 1001 may identify the user 1005 and may determine the position of the identified user 1005 to be a front left position. The electronic device 1001 may identify the user 1007 and may determine the position of the identified user 1007 to be a rear left position.

When a notification occurs with respect to the plurality of users 1003, 1005, and 1007, the electronic device 1001 may provide a relevant notification to each user. For example, when a text message is received for the user 1003, the electronic device 1001 may provide the user 1003 with an audio notification reporting that a text message is received. Here, the electronic device 1001 may set an audio parameter on the basis of location information on the user 1003 and may provide the user 1003 with the audio notification. The notification may be heard only by the user 1003 and may not be heard by the user 1005 and the user 1007.

In another example, when an email is transmitted to the user 1005, the electronic device 1001 may provide the user 1005 with an audio notification reporting that an email is received. The electronic device 1001 may set an audio parameter on the basis of location information on the user 1005 and may provide the user 1005 with the audio notification. The notification may be heard only by the user 1005 and may not be heard by the user 1003 and the user 1007.

In still another example, when the user 1007 has an appointment, the electronic device 1001 may provide the user 1007 with a voice reporting that the user 1007 has an appointment. The electronic device 1001 may set an audio parameter on the basis of location information on the user 1007 and may provide the user 1007 with appointment information via a voice. The appointment information may be heard only by the user 1007 and may not be heard by the user 1003 and the user 1005.

Figure 11:
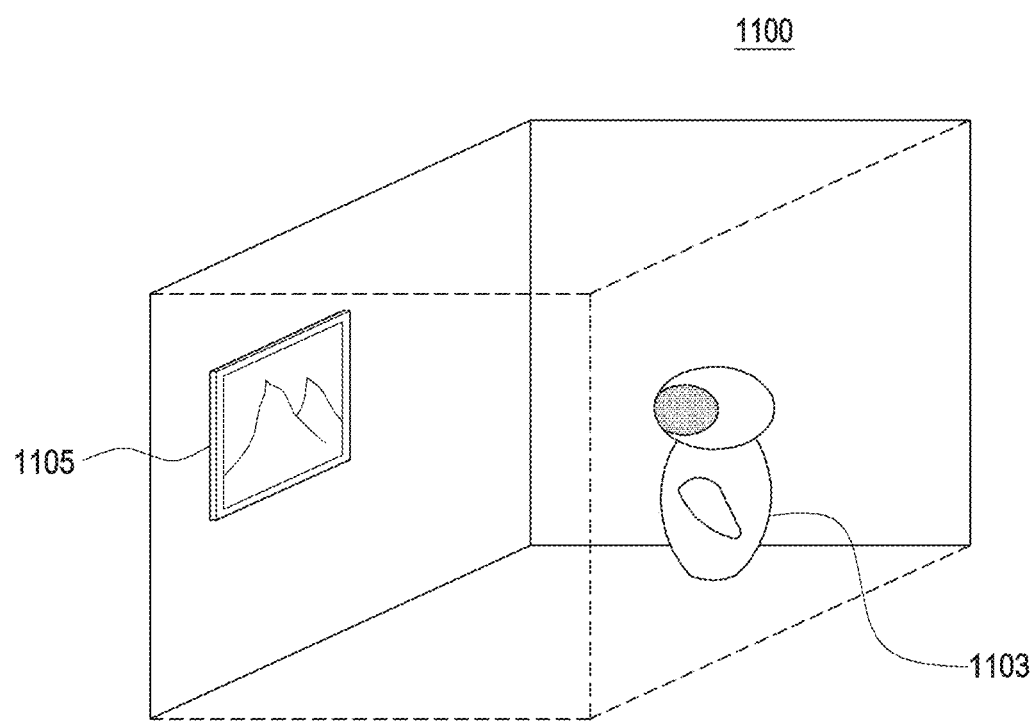
FIG. 11 illustrates an example in which an electronic device monitors the state of an object according to various embodiments of the present disclosure.

FIG. 11 illustrates an example in which an electronic device monitors the state of an object according to various embodiments of the present disclosure.

Referring to FIG. 11, the electronic device 1103 and an object 1105 are disposed in a space 1100.

The electronic device 1103 may recognize at least one object present in the space 1100. When the object is recognized, the electronic device 1103 may map information on the recognized object to space information using any information that is accessible by the electronic device 1103. The electronic device 1103 may determine the position of the recognized object in the space 1103 using the space information illustrated in FIG. 9.

The electronic device 1103 may separately set information about a situation where a notification is needed for a user according to the characteristics of the object. For example, when the electronic device 1103 recognizes the object 1105 in the space 1100 as a frame, the electronic device may recognize the basic characteristics of a frame. The basic characteristics of the frame may be set by the user or may be received from a database. The electronic device 1103 may recognize, on the basis of the basic characteristics of the frame, that a frame is generally disposed at a fixed position in a fixed direction. The electronic device 1103 may determine, as an abnormal situation, a situation where the orientation or position of a frame is changed even without any manipulation by the user and may set a notification determination criterion for a frame accordingly. That is, the electronic device 1103 may provide the user with a notification corresponding to the object 1105 on the basis of the basic characteristics of the object 1105.

Figure 12:
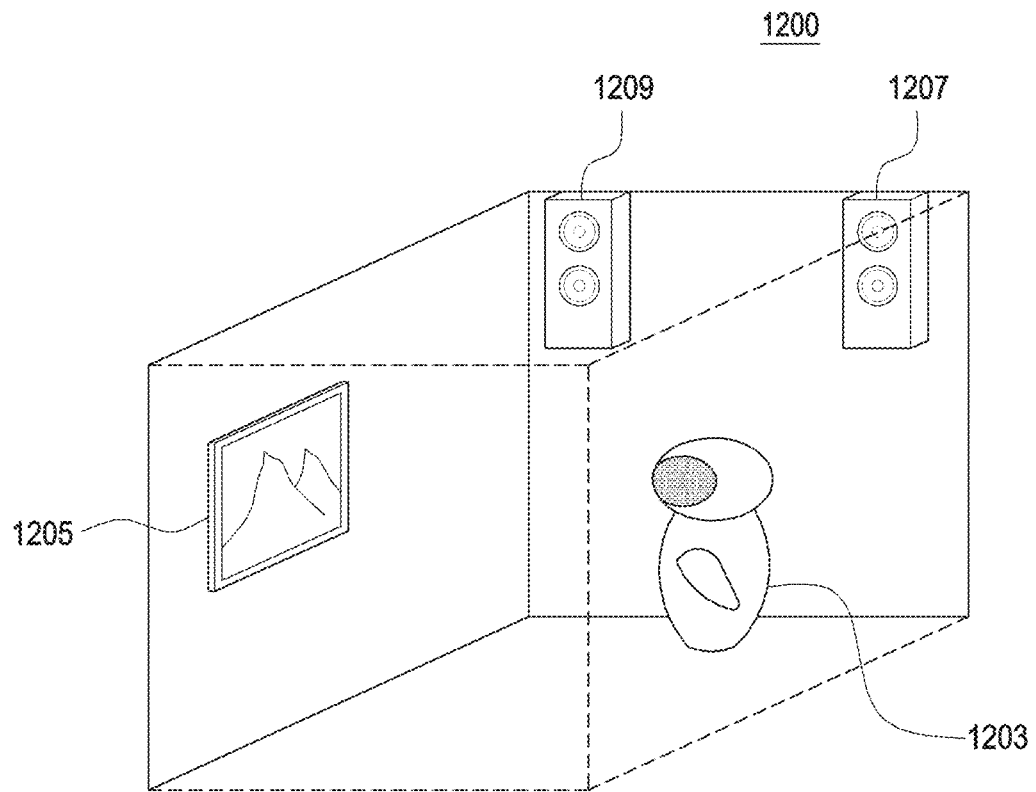
FIG. 12 illustrates an example in which an output device functionally connected to an electronic device provides a notification according to various embodiments of the present disclosure.

FIG. 12 illustrates an example in which an output device functionally connected to an electronic device provides a notification according to various embodiments of the present disclosure. Referring to FIG. 12, the electronic device 1203, an object 1205, and output devices 1207 and 1209 are disposed in a space 1200.

The object 1205 may be, for example, a frame. The output devices 1207 and 1208 may be functionally connected to the electronic device 1203 using wired or wireless communication. The output devices 1207 and 1208 may be, for example, a wireless speaker and may process audio signals of two channels.

The electronic device 1203 may recognize the object 1205 in the space and may provide a notification to a user according to the state of the object 1205. The electronic device 1203 may generate the notification on the basis of the state of the object 1205, and may provide the notification to the user via an audio output unit included in the electronic device 1203 or may transmit notification information to the output devices functionally connected to the electronic device 1203. The output devices may output a sound by driving a speaker on the basis of the received notification information.

The electronic device 1203 may determine the position of the object in the space and may control the audio output unit on the basis of the position of the object. Specifically, the electronic device 1203 may control the audio output unit so that the user may feel as if the sound is generated from the object 1205 disposed in the space.

Alternatively, the electronic device 1203 may determine the position of the object in the space, may generate an audio parameter to control the audio output unit on the basis of the position of the object, and may transmit the audio parameter to the output devices. That is, the electronic device 1203 may transmit, to the output devices, the notification information generated on the basis of the state of the object and the audio parameter generated on the basis of the position of the object.

The output devices may control the speaker and an audio processor included in the output devices using the audio parameter received from the electronic device 1203, thereby outputting a sound so that the user may feel as if the sound is generated from the object 1205.

Figure 13:
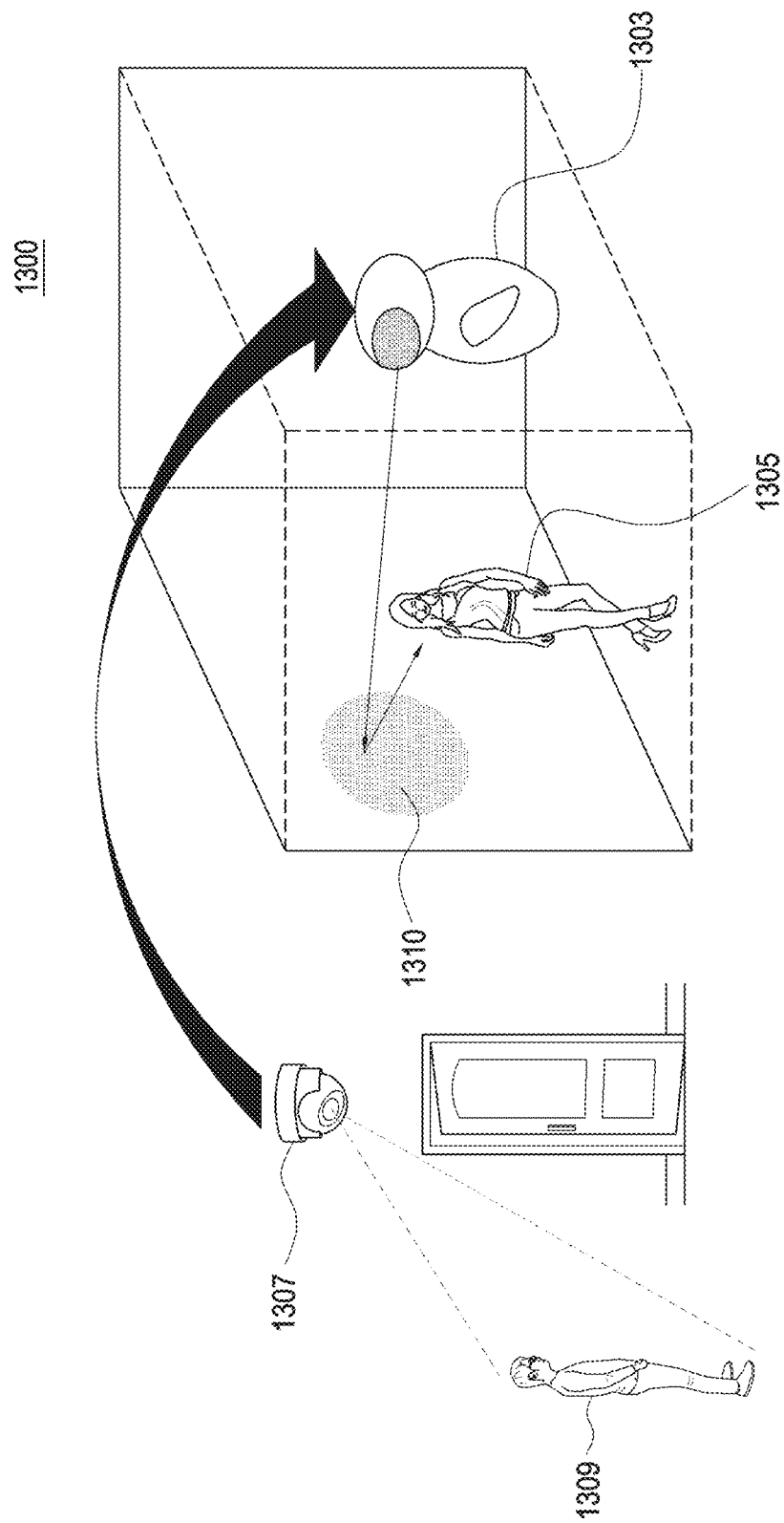
FIG. 13 illustrates an example of an object sensing device functionally connected to an electronic device according to various embodiments of the present disclosure.

FIG. 13 illustrates an example of an object sensing device functionally connected to an electronic device according to various embodiments of the present disclosure. The object sensing device may be included in the electronic device, or may be disposed outside the electronic device and may be functionally connected to the electronic device. The electronic device may receive information about an object from the functionally connected object sensing device.

Referring to FIG. 13, the electronic device 1303 and a user 1305 are positioned in a space 1300. An object 1307 may be disposed outside the space 1300. The object 1307 may be functionally connected to the electronic device 1303 via wireless communication. The object 1307 may be a CCTV having a wireless communication function and may be disposed in a porch outside the space 1300.

The electronic device 1303 and the user 1305 may be inside the space 1300. For example, the space 1300 may be a room in a house, and the electronic device 1303 and the user 1305 may be in the same room. The object 1307 functionally connectable to the electronic device 1303 may be positioned to a front wall relative to the position of the user 1305 in the space. For example, the object 1307 may be disposed beyond the front wall.

The electronic device 1303 may recognize an object in the space using various sensing tools, may determine the position of the object, and may map the position of the object to rendered space information. In various embodiments of the present disclosure, the electronic device 1303 may identify an object through a vision or audio sensing unit and may map the position of the object to the space information. Also, the electronic device 1303 may sense and recognize an object that is not in the same space as the electronic device 1303 through the object 1307 functionally connected to the electronic device 1303. The object 1307 may be functionally connected to the electronic device 1303 using wired or wireless communication. The object 1307 may transmit location information thereof to the electronic device. For example, the object 1307 may determine the position thereof through an embedded GPS receiver or through an indoor positioning technique and may transmit the location information thereof to the electronic device 1303. When an event occurs, the object 1307 may generate a notification, and may transmit notification information and the location information thereof to the electronic device 1303.

The electronic device 1303 may generate audio information corresponding to the notification information on the basis of the notification information received from the object 1307 and may output the audio information through an audio output unit. Also, the electronic device 1303 may generate an audio parameter on the basis of the location information received from the object 1307. The electronic device 1303 may control the audio output unit using the audio parameter and may change the direction of an output sound. As the direction of the audio output from the audio output unit is changed, the user may feel as if the sound is output in a direction in which the object 1307 is positioned.

For example, when the electronic device 1303 and the user 1305 are in the room and there is a visitor 1309 in the porch, the CCTV 1307 disposed in the porch may photograph the visitor and may generate notification information. The CCTV 1307 is functionally connected to the electronic device 1303 via a Wi-Fi network and may transmit the notification information and location information thereof to the electronic device 1303 in the room.

The electronic device 1303 may map the location information on the CCTV received from the object 1307 to the space information. The electronic device 1303 may identify the position of the user 1305 and a direction in which the user 1305 looks through a camera and may generate an audio parameter on the basis of the identified position of the user 1305 and the location information on the CCTV received from the object 1307. The electronic device 1303 may generate a notification message corresponding to the notification information received from the object 1307 and may control the audio output unit using the audio parameter to output a sound.

For example, the electronic device 1303 may control the audio output unit so that the user 1305 may feel as if the sound reporting that there is the visitor 1309 is output from the front wall 1310 beyond which the porch is positioned.

Figure 14:
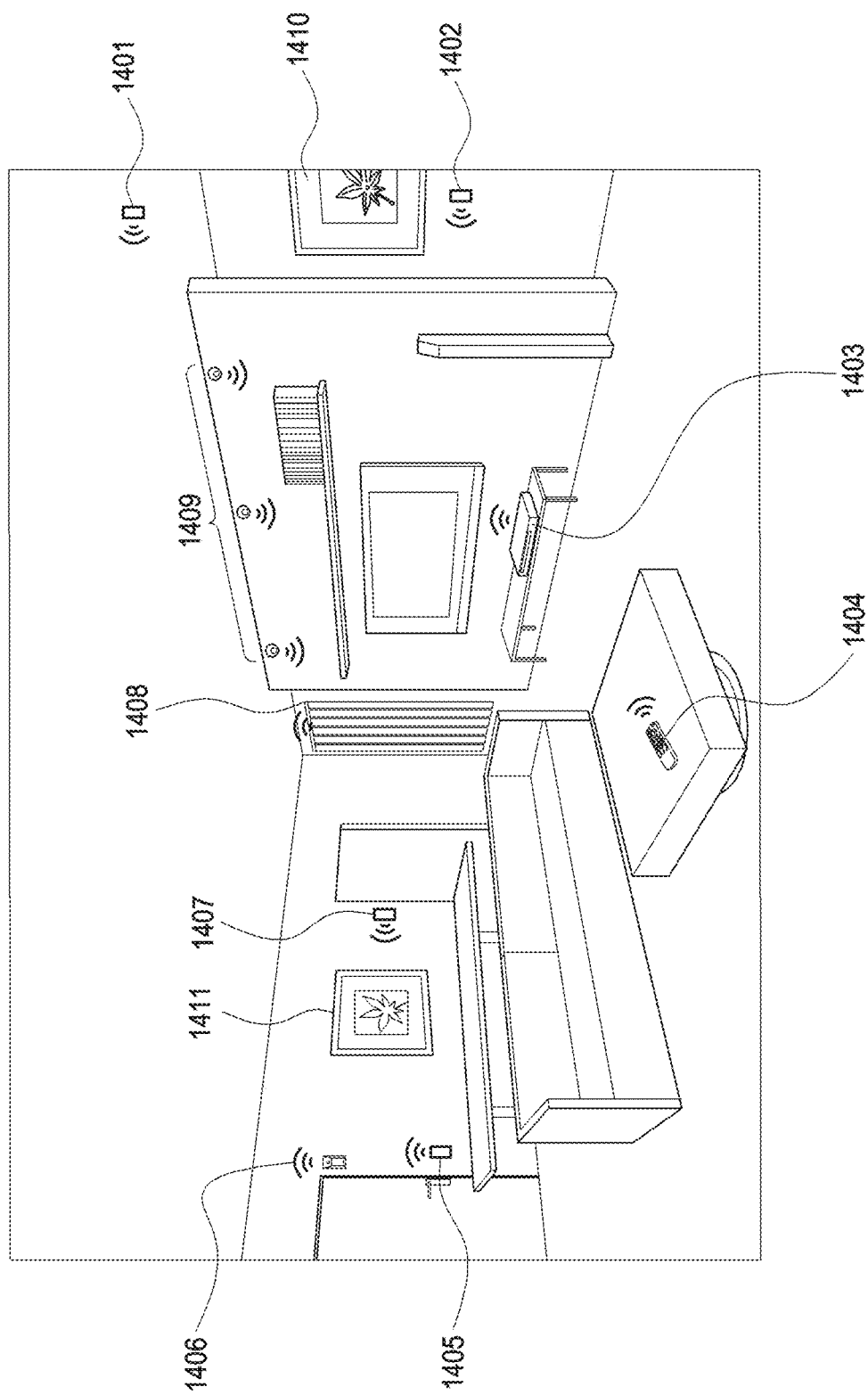
FIG. 14 illustrates an example of an object that may exist in a house.

FIG. 14 illustrates an example of an object that may exist in a house.

FIG. 14 shows various objects existing in a house. The objects may be divided into a communication object that has a communication function and is functionally connectable to an electronic device and a general object having no communication function. The communication object may be an Internet of Things (IoT) device. For example, the communication object may be a burglar alarm device security system 1401, a window control 1402, a Set-Top Box (STB) 1403, a remote controller 1404, a door control 1405, a motion sensor 1406, an environmental control 1407, a Heating, Ventilation and Air Conditioning (HVAC) control 1408, or a light control 1409. The general object having no communication function may be, for example, frames 1410 and 1411.

The communication object may transmit location information thereof to the electronic device. The communication object may include a GPS reception device, may measure the position thereof using GPS information or an indoor positioning technique, and may transmit measured location information to the electronic device. Alternatively, the location information on the communication object may be set by a user.

Location information on the general object may be set by the user or may be set by the electronic device with reference to space information rendering and the location information on the communication object.

When the location information on the communication object and the location information on the general object are determined, the electronic device may map the positions of the communication object and the general object to rendered space information.

Figure 15:
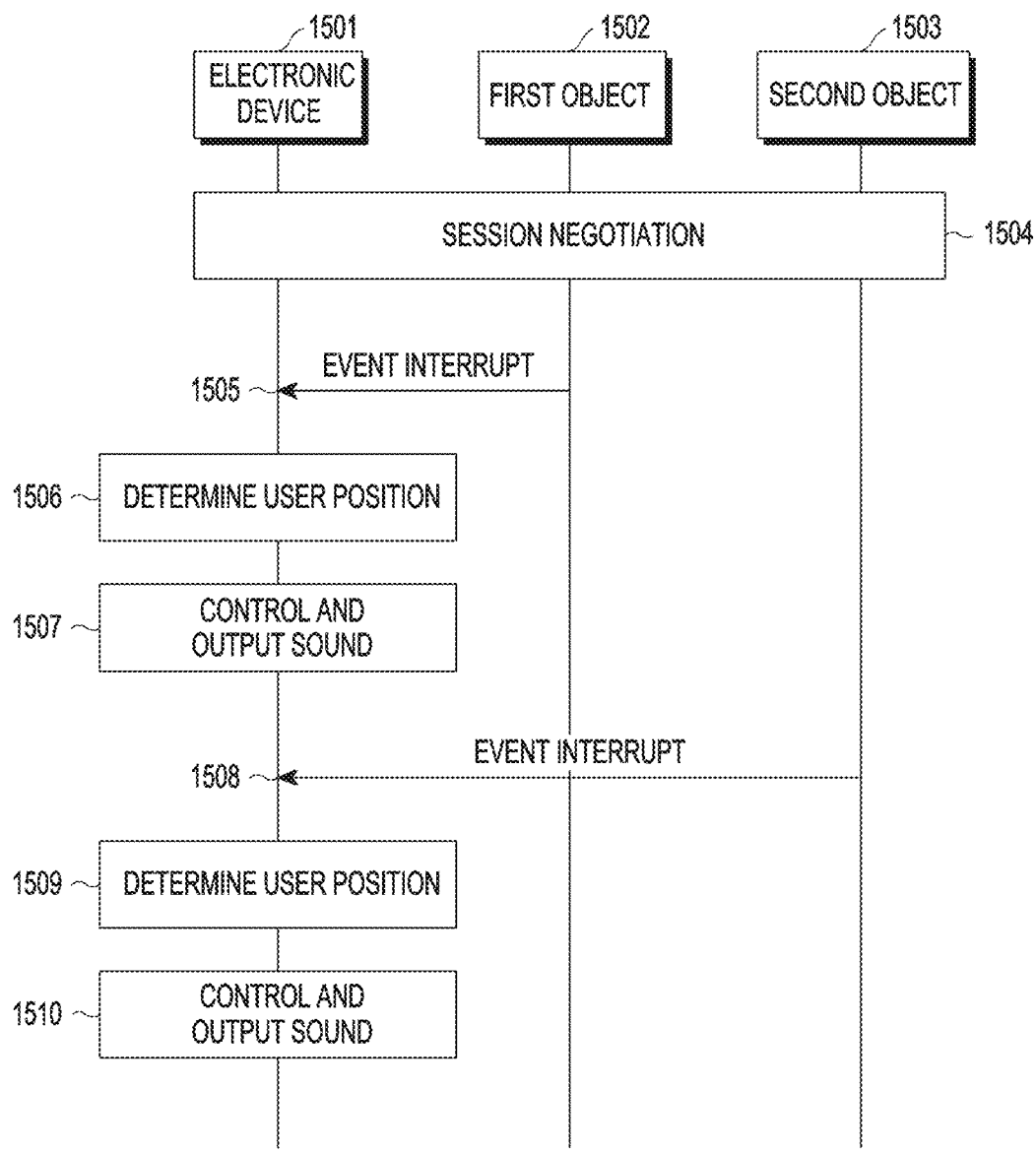
FIG. 15 is a flowchart illustrating a process in which an electronic device recognizes an object and generates a notification when an event occurs according to various embodiments of the present disclosure.

FIG. 15 is a flowchart illustrating a process in which an electronic device recognizes an object and generates a notification when an event occurs according to various embodiments of the present disclosure.

Referring to FIG. 15, the electronic device may be functionally connected to at least one object through a network. For example, the electronic device 1501 may be functionally connected to a first object 1502 and a second object 1503 via wired or wireless communication. While communicating with the electronic device 1501, the first object 1502 and the second object 1503 may transmit location information (e.g., GPS information) on the first object 1502 and the second object 1503 to the electronic device 1501 in a session negotiation process (1504). The electronic device 1501 may set and store the relative coordinates of the first object 1502 and the second object 1503 on the basis of the location information on the first object 1502 and the second object 1503 and current location information on the electronic device 1501.

When an event occurs to the first object 1502 (1505), the electronic device 1501 may determine the position of a user (1506), may generate an audio parameter on the basis of location information on the user, and may control an audio output unit (1507). The electronic device 1501 may change an audio output direction using the audio parameter and may provide notification information to the user.

When an event occurs to the second object 1503 (1508), the electronic device 1501 may determine the position of a user (1509), may generate an audio parameter on the basis of location information on the user, and may control the audio output unit (1510). The electronic device 1501 may change an audio output direction using the audio parameter and may provide notification information to the user.

Figure 16:
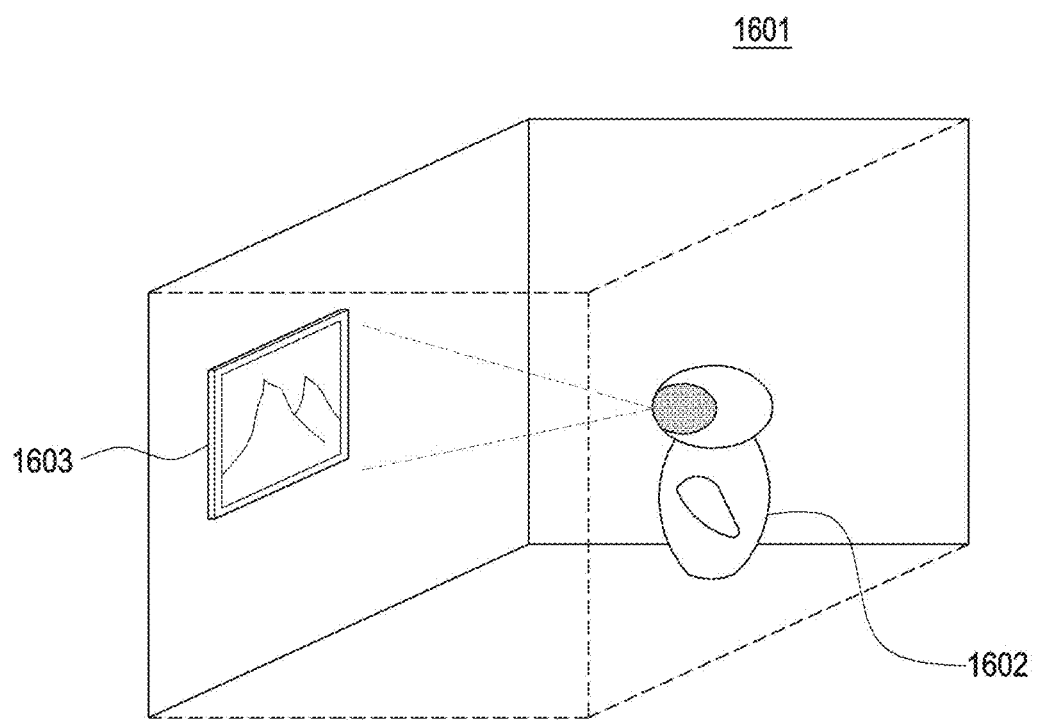
FIGS. 16 and 17 illustrate examples in which an electronic device recognizes the state of an object and provides a notification to a user according to various embodiments of the present disclosure.
Figure 17:
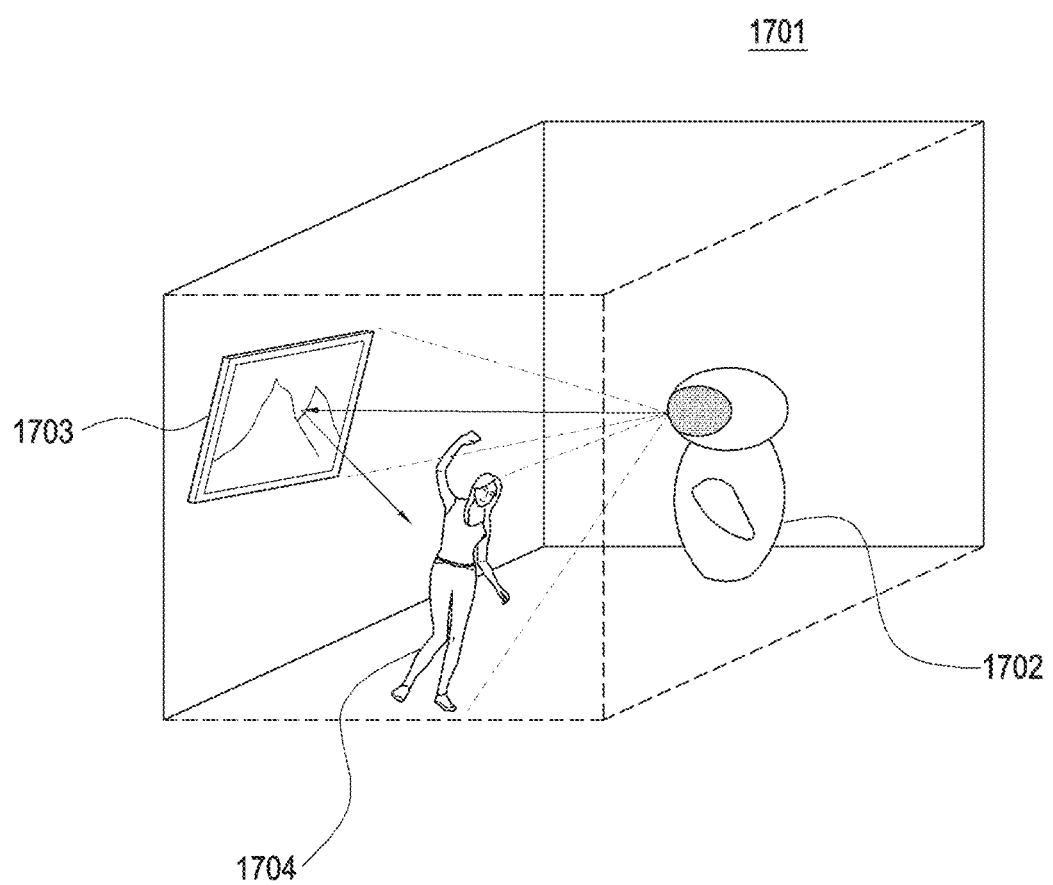

FIGS. 16 and 17 illustrate examples in which an electronic device recognizes the state of an object and provides a notification to a user according to various embodiments of the present disclosure.

FIG. 16 shows an electronic device 1602 and an object 1603 in a space 1601. The object may be disposed on a front wall relative to the electronic device. Front, rear, top, bottom, left, and right sides of the space may be reflection planes that reflect a sound.

The electronic device 1602 may analyze an image captured by a camera to recognize the object 1603 and may determine whether the object is in a normal state. When it is determined that the type of the recognized object 1603 is a frame, the electronic device 1602 may distinguish the normal state of a frame from an abnormal state of a frame by referring to a database. Alternatively, when it is determined that the recognized object 1603 is a frame, if the position of the frame is not changed for a predetermined time, the electronic device 1602 may determine that the frame 1603 is in the normal state. When the position of the frame is changed, the electronic device 1602 may determine that the frame is in the abnormal state.

FIG. 17 shows an electronic device 1702 and an object 1703 in a space 1701. The object 1703 may be disposed on a front wall relative to the electronic device 1702 and may be disposed in an abnormal state. For example, the object 1703 may be a frame, which may be disposed on the front wall in a slanted state.

Front, rear, top, bottom, left, and right sides of the space 1701 may be reflection planes that reflect sound. The electronic device 1702 may analyze an image captured by a camera to recognize the object 1703 and may determine whether the object 1703 is in the abnormal state. When it is determined that the recognized object 1703 is a frame, the electronic device 1702 may distinguish a normal state of a frame from an abnormal state of a frame by referring to a database. When it is determined that the object 1703 is in the abnormal state, the electronic device 1702 may generate a notification event corresponding to the object 1703 and generate notification information. Further, the electronic device 1702 may generate an audio parameter on the basis of location information on a user 1704 and location information on the object 1703 and may control an audio output unit using the audio parameter. The electronic device 1702 may control the audio output unit to change an audio output direction, making the user 1704 feel as if a sound is output from the position of the object 1703.

That is, the electronic device 1702 may generate a notification on the basis of state information on the object 1703 and may control the audio output unit on the basis of the location information on the object 1703 and the location information on the user 1704.

Figure 18:
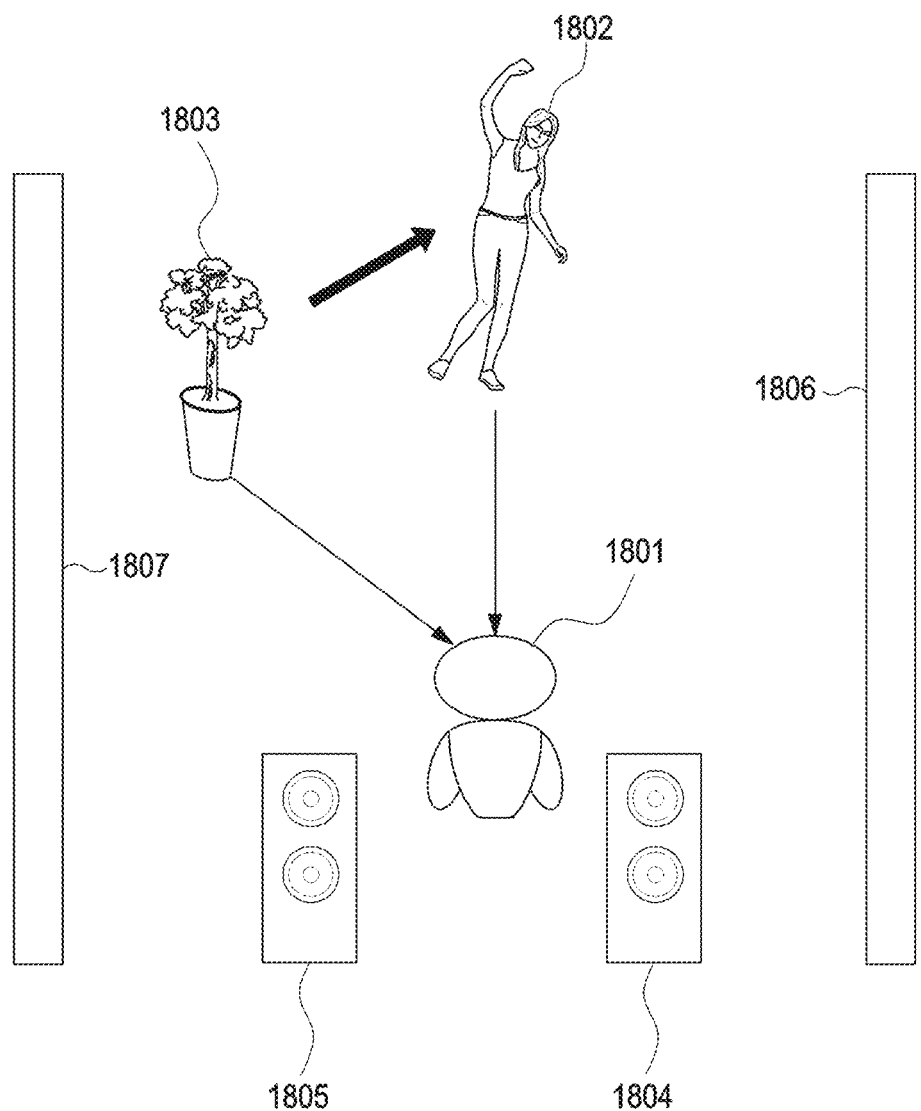
FIGS. 18 and 19 illustrate examples in which an electronic device controls an audio output unit on the basis of the positions of an object and a user according to various embodiments of the present disclosure.
Figure 19:
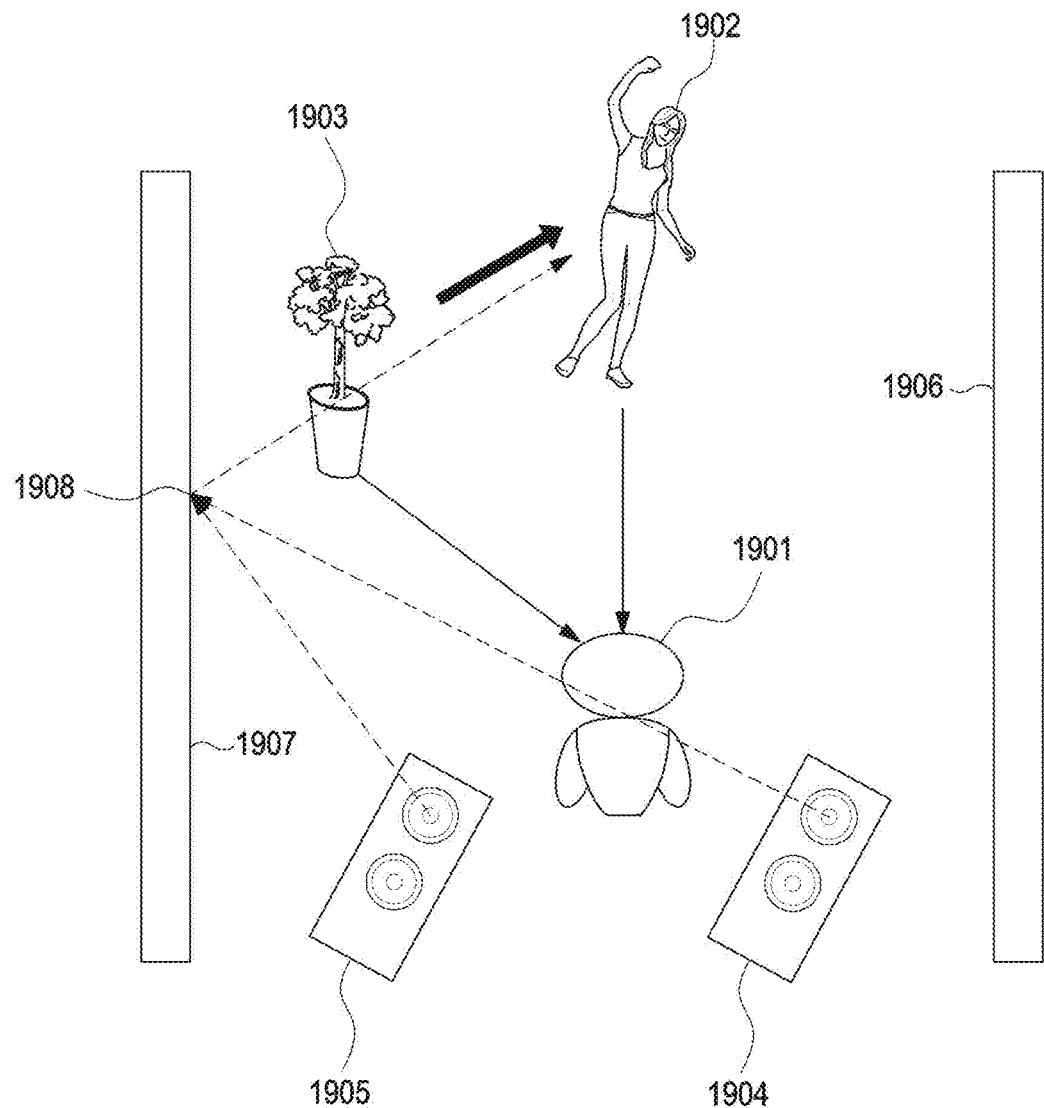

FIGS. 18 and 19 illustrate examples in which an electronic device controls an audio output unit on the basis of the positions of an object and a user according to various embodiments of the present disclosure.

FIG. 18 shows an electronic device 1801, an object 1803, a user 1802, and audio output devices 1804 and 1805. The audio output devices 1804 and 1805 may be functionally connected to the electronic device 1801 via wired/wireless communication.

The electronic device 1801 may obtain space information on where the electronic device 1801 is located and may set a point at which sound reflection may occur. The electronic device 1801 may render the space information and may map the point where sound reflection may occur to the space information.

The electronic device 1801 may recognize the object 1803 in the space, may determine the type of the recognized object 1803, and may determine whether the recognized object 1803 is currently in a condition where a notification is needed. The electronic device 1801 may check the state of the recognized object 1803, and may identify the position of the user 1802 when it is determined that the recognized object 1803 is in a condition where a notification is needed. When the position of the user 1802 is identified, the electronic device 1801 may determine an audio output direction to generate an audio parameter on the basis of user location information on the user 1802 and location information on the object 1803, and may control an audio output unit or may control a driver of the electronic device 1801. Alternatively, the electronic device 1801 may transmit the generated audio parameter to the audio output devices 1804 and 1805.

The electronic device 1801 may generate notification information corresponding to the object 1803 and may output the generated notification information through the audio output unit or the audio output devices 1804 and 1805. Here, an output sound may be reflected on reflection walls 1806 and 1807 of the space and may be transmitted to the user 1802, and the user 1802 may feel as if the sound is output in the direction of the object 1803 about which a notification is needed.

FIG. 19 shows an electronic device 1901, an object 1903, a user 1902, and audio output devices 1904 and 1905. The audio output devices 1904 and 1905 may be functionally connected to the electronic device 1901 through wired/wireless communication and include a driver. The direction of the audio output devices 1904 and 1905 may be changed by the driver.

The electronic device 1901 may obtain space information on where the electronic device 1901 is located and may set a point at which sound reflection may occur. The electronic device 1901 may render the space information and may map the point where sound reflection may occur to the space information.

The electronic device 1901 may recognize the object 1903 in the space, may determine the type of the recognized object 1903, and may determine whether the recognized object 1903 is currently in a condition where a notification is needed. The electronic device 1901 may check the state of the recognized object 1903, and may identify the position of the user 1902 when it is determined that the recognized object 1903 is in a condition where a notification is needed. When the position of the user 1902 is identified, the electronic device 1901 may determine an audio output direction to generate an audio parameter on the basis of user location information on the user 1902 and location information on the object 1903, and may control an audio output unit or may control a driver of the electronic device 1901. The electronic device 1901 may set a reflection point 1908 on reflection walls 1906 and 1907 in the space on the basis of the user location information and the location information on the object 1903. Alternatively, the electronic device 1901 may transmit the generated audio parameter to the audio output devices 1904 and 1905. The audio output devices 1904 and 1905 may include a driver and may control the driver using the audio parameter transmitted from the electronic device 1901. Further, the audio output devices 1904 and 1905 may include an audio processor, may process a sound in the audio processor using the audio parameter transmitted from the electronic device 1901, and may drive the speaker to output a sound.

The electronic device 1901 may generate notification information corresponding to the object and may output the generated notification information through the audio output unit or the audio output devices. Here, an output sound may be reflected at the reflection point in the space and may be transmitted to the user 1902, and the user 1902 may feel as if the sound is output in the direction of the object 1903 about which a notification is needed.

Figure 20:
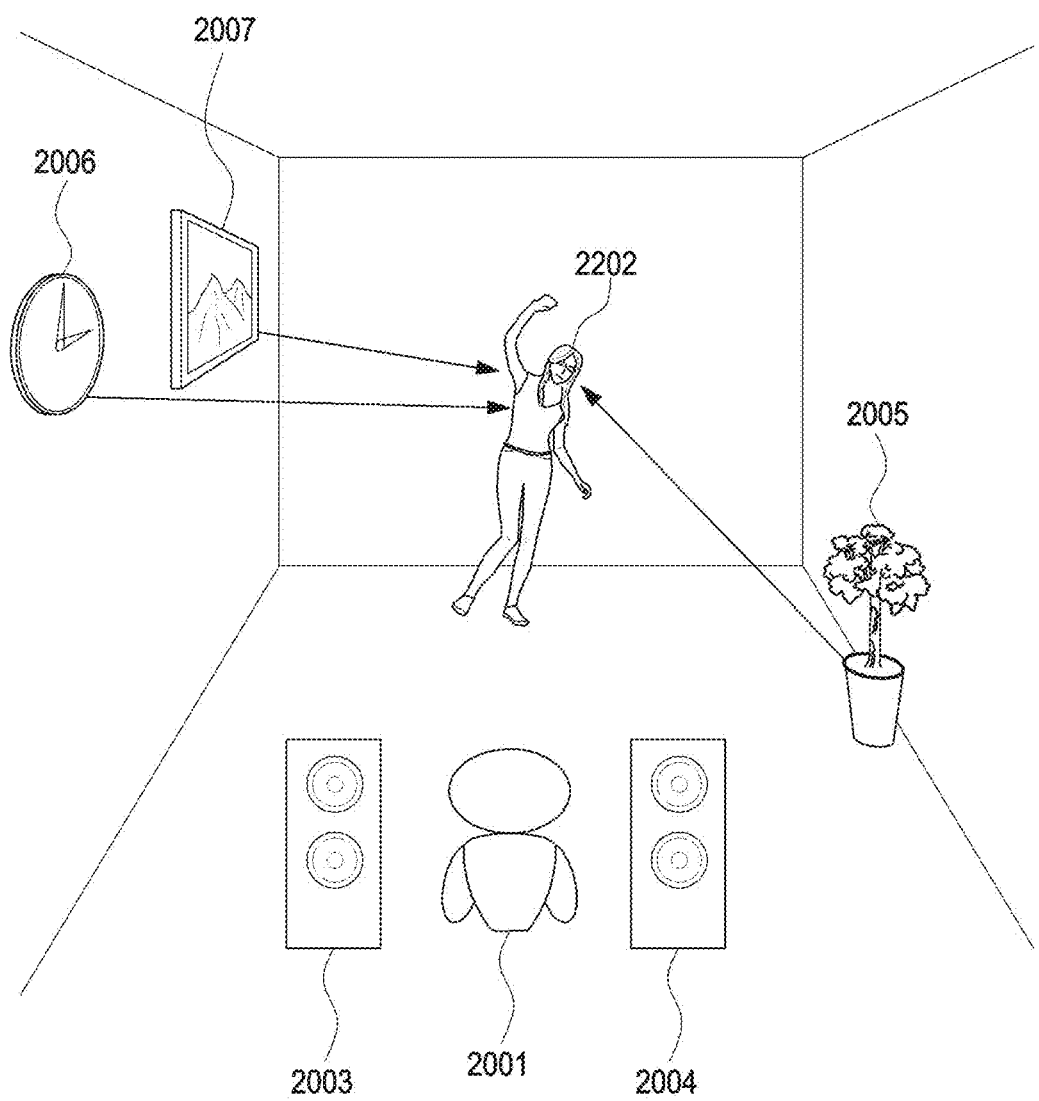
FIG. 20 illustrates an example in which an electronic device provides an audio notification with the characteristics of an object reflected according to various embodiments of the present disclosure.

FIG. 20 illustrates an example in which an electronic device provides an audio notification with the characteristics of an object reflected according to various embodiments of the present disclosure.

FIG. 20 shows an electronic device 2001, a user 2002, audio output devices 2003 and 2004, and objects 2005, 2006, and 2007. The audio output devices 2003 and 2004 may be functionally connected to the electronic device 2001 through wired/wireless communication and may include a driver. The direction of the audio output devices 2003 and 2004 may be changed by the driver.

The electronic device 2001 may obtain space information on where the electronic device 2001 is located and may set a point at which sound reflection may occur. The electronic device 2001 may render the space information and may map the point where sound reflection may occur to the space information.

The objects 2005, 2006, and 2007 may be things in the space. The objects 2005, 2006, and 2007 may be things that are functionally connected to the electronic device 2001 via wired or wireless communication or that are not functionally connected to the electronic device 2001. For example, the object 2005 may be a flowerpot and may not be functionally connected to the electronic device 2001. The object 2006 may be a clock and may be functionally connected to the electronic device 2001. The object 2007 may be a frame and may not be functionally connected to the electronic device 2001.

The electronic device 2001 may sense the space via a camera and may identify the position of the user 2002 and the objects 2005, 2006, and 2007. The electronic device 2001 may recognize the user 2002 and the objects 2005, 2006, and 2007 from an image captured through the camera, may extract location information on the user and the objects, and may map the location information to space information. For example, referring to the captured image, the electronic device 2001 may divide the structure of the space into front, rear, right, left, ceiling, or floor with respect to the electronic device 2001. For example, the electronic device 2001 may recognize that, on the basis of the electronic device 2001, the object 2005 is disposed in the right middle portion of the space, the object 2006 is disposed in the left front portion of the space, the object 2007 is disposed in the left rear portion of the space, and the user 2002 is located in the front rear portion of the space. When the objects 2005, 2006, and 2007 are functionally connected to the electronic device 2001, the objects 2005, 2006, and 2007 may transmit information thereof to the electronic device 2001. For example, the object 2006 may be functionally connected to the electronic device 2001 and may transmit location information to the electronic device 2001.

The electronic device 2001 may identify the state and characteristics of the objects disposed in the space and may provide the user 2002 with a notification corresponding to the objects. The notification may be provided as a sound through an output unit of the electronic device 2001. The electronic device 2001 may provide the notification by modifying the notification into a voice appropriate for the characteristics of the objects in order to maximize the effect of providing the notification.

For example, when the electronic device 2001 photographs the flowerpot 2005 in the space to obtain image data, analyzes the obtained data, and determines that flowers in the flowerpot 2005 wilted, the electronic device 2001 may provide the user 2002 with an audio notification reporting "Please water me." The electronic device 2001 may analyze the characteristics of the photographed flowerpot 2005, may classify a characteristic as female, and may provide the notification with a female voice in order to maximize the effect of the notification. The electronic device 2001 may refer to an external database or user setup data in order to identify the characteristics of the objects. For example, the external database has information about what kind of voice is to be provided for the characteristics of various objects, and the electronic device 2001 may refer to the external database in providing a notification and may provide a notification with a corresponding voice. Alternatively, when there is data preset by a user, the electronic device 2001 may refer to user setup data and may provide a notification with a corresponding voice. Alternatively, when image date obtained from a photographed object includes a person, the electronic device 2001 may recognize the person and may change and provide a notification corresponding to a voice appropriate for the gender or age of the identified person. For example, when an identified person is a woman in her 20s, the electronic device 2001 may provide a notification with a voice of a woman in her 20s. Further, when a characteristic of a photographed object is identified as a man in his 30s, the electronic device 2001 may provide a notification with a voice of a man in his 30s.

Further, the electronic device 2001 may identify the position of the flowerpot 2005 in the space and the position of the user 2002 and may adjust an audio output direction, the latency and frequency band of a sound, or the volume per frequency by controlling the audio output unit of the electronic device 2001 in order to feel as if a sound is output from the flowerpot. Alternatively, the electronic device 2001 may control a driver of the electronic device 2001 and may change the orientation of the electronic device 2001 in order to feel as if a sound is output from the flowerpot. Alternatively, the electronic device 2001 may generate an audio parameter for adjusting an audio output direction or the latency and the frequency band of a sound and may transmit the generated audio parameter to the audio output devices 2004 and 2005 in order to feel as if a sound is output from the flowerpot. The audio output devices 2004 and 2005 may include a driver and may control the driver using the audio parameter transmitted from the electronic device 2001. Further, the audio output devices 2004 and 2005 may include an audio processor, may process a sound in the audio processor using the audio parameter transmitted from the electronic device 2001, and may drive a speaker to output the sound.

In another example, when the electronic device 2001 photographs the clock 2006 in the space to obtain image data, analyzes the obtained data, and determines that the clock 2006 displays the incorrect time, the electronic device 2001 may provide the user with an audio notification reporting "Please correct the time."

The electronic device 2001 may analyze the characteristics of the photographed clock 2005, may classify a characteristic as male, and may provide the notification with a male voice in order to maximize the effect of the notification. The electronic device 2001 may refer to an external database or user setup data in order to identify the characteristics of the objects. For example, the external database has information about what kind of voice is to be provided for the characteristics of various objects, and the electronic device 2001 may refer to the external database in providing a notification and may provide a notification with a corresponding voice. Alternatively, when there is data preset by the user, the electronic device 2001 may refer to user setup data and may provide a notification with a corresponding voice. Alternatively, when image date obtained from a photographed object includes a person, the electronic device 2001 may recognize the person and may change and provide a notification corresponding to a voice appropriate for the gender or age of the identified person. For example, when an identified person is a woman in her 20s, the electronic device 2001 may provide a notification with a voice of a woman in her 20s. Further, when a characteristic of a photographed object is identified as a man in his 30s, the electronic device 2001 may provide a notification with a voice of a man in his 30s.

Further, the electronic device 2001 may identify the position of the clock 2006 in the space and the position of the user and may adjust an audio output direction, the latency and frequency band of a sound, or the volume per frequency by controlling the audio output unit of the electronic device 2001 in order to feel as if a sound is output from the clock. Alternatively, the electronic device 2001 may control the driver of the electronic device 2001 and may change the orientation of the electronic device 2001 in order to feel as if a sound is output from the clock. Alternatively, the electronic device 2001 may generate an audio parameter for adjusting an audio output direction or the latency and the frequency band of a sound and may transmit the generated audio parameter to the audio output devices 2004 and 2005 in order to feel as if a sound is output from the clock. The audio output devices 2004 and 2005 may include a driver and may control the driver using the audio parameter transmitted from the electronic device 2001. Further, the audio output devices 2004 and 2005 may include an audio processor, may process a sound in the audio processor using the audio parameter transmitted from the electronic device 2001, and may drive a speaker to output the sound.

In still another example, when the electronic device 2001 photographs the frame 2007 in the space to obtain image data, analyzes the obtained data, and determines that the frame 2005 is slanted, the electronic device 2001 may provide the user with an audio notification reporting "Please straighten me."

The electronic device 2001 may analyze the characteristics of the photographed frame 2007, may identify that a male face is shown in the frame, and may provide the notification with a male voice in order to maximize the effect of the notification. The electronic device 2001 may refer to an external database or user setup data in order to identify the characteristics of the objects. For example, the external database has information about what kind of voice is to be provided for the characteristics of various objects, and the electronic device 2001 may refer to the external database in providing a notification and may provide a notification with a corresponding voice. Alternatively, when there is data preset by the user 2002, the electronic device 2001 may refer to user setup data and may provide a notification with a corresponding voice. Alternatively, when image date obtained from a photographed object includes a person, the electronic device 2001 may recognize the person and may change and provide a notification corresponding to a voice appropriate for the gender or age of the identified person. For example, when an identified person is a woman in her 20s, the electronic device 2001 may provide a notification with a voice of a woman in her 20s. Further, when a characteristic of a photographed object is identified as a man in his 30s, the electronic device 2001 may provide a notification with a voice of a man in his 30s.

Further, the electronic device 2001 may identify the position of the frame 2007 in the space and the position of the user 2002 and may adjust an audio output direction, the latency and frequency band of a sound, or the volume per frequency by controlling the audio output unit of the electronic device 2001 in order to feel as if a sound is output from the frame. Alternatively, the electronic device 2001 may control the driver of the electronic device 2001 and may change the orientation of the electronic device 2001 in order to feel as if a sound is output from the clock. Alternatively, the electronic device 2001 may generate an audio parameter for adjusting an audio output direction or the latency and the frequency band of a sound and may transmit the generated audio parameter to the audio output devices 2004 and 2005 in order to feel as if a sound is output from the clock. The audio output devices 2004 and 2005 may include a driver and may control the driver using the audio parameter transmitted from the electronic device 2001. Further, the audio output devices 2004 and 2005 may include an audio processor, may process a sound in the audio processor using the audio parameter transmitted from the electronic device 2001, and may drive a speaker to output the sound.

As described above, the electronic device 2001 may analyze the characteristics of a photographed object and may provide a notification by converting a voice on the basis of the characteristics of the photographed object. Here, the characteristics may be, for example, determining the gender and age of the object, and the electronic device 2001 may provide the notification by converting a voice corresponding to the determined gender and age of the object.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

According to various embodiments of the present disclosure, a storage medium stores commands, wherein the commands are set for at least one processor to perform at least one operation when executed by the at least one processor, and the at least one operation may include: obtaining an image; and outputting a message generated on the basis of an image analysis result of analyzing the obtained image and additional information.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

The invention claimed is:

1. An electronic device comprising:
   a sensing unit;
   an output unit; and
   a processor configured to:
      receive image data from the sensing unit,
      generate space information by rendering information on a space from the image data,
      recognize an object in the space,
      map the object to the space information, and
      control the output unit, so that a sound output from the output unit is reflected at a position of the object and is transmitted to a user, on the basis of location information on the object and the user in response to an occurrence of a notification associated with the object.

2. The electronic device of claim 1, wherein the processor controls the output unit by changing at least one of a latency, a volume, a frequency band, or a volume per frequency of the sound.

3. The electronic device of claim 1, further comprising:
   a driver configured to move the electronic device,
   wherein the processor controls the driver on the basis of the location information on the object and the user.

4. The electronic device of claim 3, wherein the processor controls the driver so that the sound output from the output unit is reflected at a position of the object and is transmitted to a user.

5. The electronic device of claim 1, wherein the electronic device generates the notification when a position or angle at which the object is disposed is changed.

6. The electronic device of claim 1, further comprising:
   a communication unit,
   wherein the processor receives location information on an object sensing device from the object sensing device functionally connected to the electronic device via the communication unit and controls the output unit on the basis of the location information on the external sensing unit.

7. The electronic device of claim 6, wherein the processor controls the output unit so that the sound output from the output unit is reflected in a direction where the object sensing device is positioned.

8. The electronic device of claim 1, wherein the electronic device is functionally connected to an audio output device, and the processor generates an audio parameter on the basis of the location information on the object and the location information on the user, and transmits the notification and the audio parameter to the audio output device if the notification occurs.

9. An electronic device comprising:
   a sensing unit configured to sense an object and a user;
   a memory configured to store space information on a space where the electronic device is positioned;
   a first audio output unit configured to output a sound; and
   a processor configured to control at least one of the first audio output unit and an external second audio output unit so that a sound corresponding to a notification is transmitted from a position of the object being sensed by the sensing unit using the space information to a position of the user, in response to an occurrence of the notification associated with the object.

10. An audio output method of an electronic device, the method comprising:
    receiving image data from a sensing unit, and generating space information by rendering information on a space from the image data;
    recognizing an object in the space;
    mapping the object to the space information;
    recognizing a user in the space; and
    controlling output of a sound, so that the sound output from an output unit of the electronic device is reflected at a position of the object and is transmitted to the user, on the basis of location information on the object and the user in response to an occurrence of a notification associated with the object.

11. The method of claim 10, wherein the method controls the output of the sound by changing at least one of a latency, a volume, a frequency band, and a volume per frequency of the sound.

12. The method of claim 10, further comprising:
    controlling a movement of the electronic device on the basis of the location information on the object and the user.

13. The method of claim 12, wherein the method controls the driver so that the sound output from an output unit is reflected at a position of the object and is transmitted to the user.

14. The method of claim 10, wherein the method generates the notification when a position or angle at which the object is disposed is changed.

15. The method of claim 10, wherein the method further comprising:
    receiving location information on an object sensing device from the object sensing device functionally connected to the electronic device; and
    controlling an output unit on the basis of the location information on the external sensing unit.

16. The method of claim 15, wherein the method controls the output unit so that the sound output from the output unit is reflected in a direction where the object sensing device is positioned, and is transmitted to a user.

17. The method of claim 16, wherein the method further comprising:
    generating an audio parameter on the basis of the location information on the object and the location information on the user; and
    transmitting the notification and the audio parameter to an audio output device functionally connected to the electronic device if the notification occurs.

18. An audio output method of an electronic device, the method comprising:
    storing space information on a space where the electronic device is positioned;
    sensing an object and a user using a sensing unit of the electronic device; and
    controlling at least one of a first audio output unit and an external second audio output unit so that a sound corresponding to a notification is transmitted from a position of the object being sensed by the sensing unit using the space information to a position of the user, in response to an occurrence of the notification associated with the object.

* * * * *